(12) United States Patent
Wada et al.

(10) Patent No.: US 8,695,007 B2
(45) Date of Patent: Apr. 8, 2014

(54) COMPUTER SYSTEM AND METHOD OF SCHEDULING A VIRTUAL PROCESSOR TO RUN ON PHYSICAL PROCESSORS BASED ON THE NUMBER OF POSSESSING CYCLES OF EACH VIRTUAL COMPUTER

(75) Inventors: Shintaro Wada, Hadano (JP); Shuhei Matsumoto, Yokohama (JP); Hironori Inoue, Ebina (JP); Kenichiro Yamato, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 438 days.

(21) Appl. No.: 13/041,012

(22) Filed: Mar. 4, 2011

(65) Prior Publication Data
US 2011/0225591 A1 Sep. 15, 2011

(30) Foreign Application Priority Data
Mar. 9, 2010 (JP) ................................. 2010-051575

(51) Int. Cl.
G06F 9/46 (2006.01)
G06F 9/455 (2006.01)
G06F 1/00 (2006.01)

(52) U.S. Cl.
USPC ................ 718/104; 718/1; 718/102; 713/300

(58) Field of Classification Search
None
See application file for complete search history.

(56) References Cited

U.S. PATENT DOCUMENTS

| | | | |
|---|---|---|---|
| 7,594,128 B2 | 9/2009 | Bacchus et al. | |
| 8,291,413 B2* | 10/2012 | Mizuno | 718/1 |
| 2004/0111596 A1* | 6/2004 | Rawson, III | 713/1 |
| 2006/0230400 A1* | 10/2006 | Armstrong et al. | 718/1 |
| 2006/0253715 A1 | 11/2006 | Ghiasi et al. | |
| 2008/0184227 A1* | 7/2008 | Matsumoto et al. | 718/1 |
| 2009/0113426 A1 | 4/2009 | Mizuno | |
| 2009/0150896 A1* | 6/2009 | Tsushima et al. | 718/104 |

FOREIGN PATENT DOCUMENTS

| | | |
|---|---|---|
| JP | 2009-110404 | 5/2009 |
| JP | 2009-140157 | 6/2009 |

* cited by examiner

*Primary Examiner* — Abdullah Al Kawsar
(74) *Attorney, Agent, or Firm* — Foley & Lardner LLP

(57) ABSTRACT

A hypervisor calculates the total number of processor cycles (the number of processor cycles of one or more physical processors) in a first length of time based on the sum of the operating frequencies of the respective physical processors and the first length of time for each first length of time (for example, a scheduling initialization cycle $T_1$, which will be explained further below). The hypervisor calculates for each virtual computer the number of possessing cycles, which is a value obtained by the total number of processor cycles being distributed in proportion to the service ratios of multiple virtual computers. In virtual processor scheduling, the hypervisor runs a virtual processor inside a virtual computer on any physical processor based on the number of hold cycles of each virtual computer.

15 Claims, 22 Drawing Sheets

FIG. 16

| ELAPSED TIME (ms) | VIRTUAL COMPUTER #1 | VIRTUAL COMPUTER #2 | VIRTUAL COMPUTER #3 |
|---|---|---|---|
| 0 | 0/240 | 0/144 | 0/96 |
| 5 | 16/240 | 8/144 | 0/96 |
| 10 | 16/240 | 16/144 | 16/96 |
| 15 | 32/240 | 24/144 | 16/96 |
| 20 | 48/240 | 32/144 | 16/96 |
| 25 | 56/240 | 32/144 | 32/96 |
| 30 | 64/240 | 48/144 | 32/96 |
| 35 | 80/240 | 56/144 | 32/96 |
| 40 | 96/240 | 64/144 | 32/96 |
| 45 | 104/240 | 64/144 | 48/96 |
| 50 | 112/240 | 80/144 | 48/96 |
| 55 | 128/240 | 80/144 | 56/96 |
| 60 | 144/240 | 80/144 | 64/96 |
| 65 | 152/240 | 96/144 | 64/96 |
| 70 | 160/240 | 112/144 | 64/96 |
| 75 | 176/240 | 112/144 | 72/96 |
| 80 | 192/240 | 112/144 | 80/96 |
| 85 | 200/240 | 128/144 | 80/96 |
| 90 | 208/240 | 128/144 | 96/96 |
| 95 | 224/240 | 136/144 | 96/96 |
| 100 | 240/240 | 144/144 | 96/96 |

■ RUNS ON PHYSICAL PROCESSOR #0
▨ RUNS ON PHYSICAL PROCESSOR #1

FIG. 17

| TIME PERIOD (ms) | VIRTUAL COMPUTER #1 | VIRTUAL COMPUTER #2 | VIRTUAL COMPUTER #3 |
|---|---|---|---|
| 0~5 | CPU 0 | CPU 1 | |
| 5~10 | | CPU 1 | CPU 0 |
| 10~15 | CPU 0 | CPU 1 | |
| 15~20 | CPU 0 | CPU 1 | |
| 20~25 | CPU 1 | | CPU 0 |
| 25~30 | CPU 1 | CPU 0 | |
| 30~35 | CPU 0 | CPU 1 | |
| 35~40 | CPU 0 | CPU 1 | |
| 40~45 | CPU 1 | | CPU 0 |
| 45~50 | CPU 1 | CPU 0 | |
| 50~55 | CPU 0 | | CPU 1 |
| 55~60 | CPU 0 | | CPU 1 |
| 60~65 | CPU 1 | CPU 0 | |
| 65~70 | CPU 1 | CPU 0 | |
| 70~75 | CPU 0 | | CPU 1 |
| 75~80 | CPU 0 | | CPU 1 |
| 80~85 | CPU 1 | CPU 0 | |
| 85~90 | CPU 1 | | CPU 0 |
| 90~95 | CPU 0 | CPU 1 | |
| 95~100 | CPU 0 | CPU 1 | |

COMPUTER SYSTEM AND METHOD OF SCHEDULING A VIRTUAL PROCESSOR TO RUN ON PHYSICAL PROCESSORS BASED ON THE NUMBER OF POSSESSING CYCLES OF EACH VIRTUAL COMPUTER

CROSS-REFERENCE TO PRIOR APPLICATION

This application relates to and claims the benefit of priority from Japanese Patent Application No. 2010-51575 filed on Mar. 9, 2010, the entire disclosure of which is incorporated herein by reference.

BACKGROUND

This invention describes the virtualization of computers, and more particularly to scheduling in a virtual processor.

Computer virtualization is a known technology. In computer virtualization, generally one or more physical processors are shared by time-sharing among multiple virtual computers. Specifically, multiple virtual computers comprise multiple virtual processors, and each of these multiple virtual processors can be scheduled to a physical processor.

In computer virtualization, it is desirable that each of the multiple virtual processors utilize the physical processors according to ratios proportionate to the service ratios of the multiple virtual computers. It is also desirable that the power consumption of the computer system be reduced while preventing a drop in the throughput of the computer system (for example, a server apparatus).

In Japanese Patent Laid-open Publication No. 2009-110404, there is disclosed technology related to the scheduling of an allocation of a virtual processor to a physical processor. According to Japanese Patent Laid-open Publication No. 2009-110404, when the operating frequency of a physical processor in a computer system drops, more processing time is allocated to a prescribed guest operating system (a guest OS).

In Japanese Patent Laid-open Publication No. 2009-140157, a method for increasing the number of physical processors in sleep mode by disassigning virtual processors in order to reduce the power consumption of the computer system is disclosed. The operating rate of the virtual processor is used as the criteria for assigning and disassigning a virtual processor to/from the physical processor. An allocation rate may also be set for each virtual processor. The operating frequency of the physical processor is determined based on the sum of the allocation rates of virtual processors assigned to the physical processor.

SUMMARY

There may be cases where the operating frequencies of each physical processors in a computer system are not uniform. For example, there are cases where a computer system is comprised from multiple physical processors, and the operating frequencies of these multiple physical processors are different. Furthermore, even on a computer system with a single physical processor, there can be cases where the operating frequency of the physical processor is adjustable. The operating frequency at a first point of time may differ from the operating frequency at a second point of time.

The number of instructions that a physical processor is able to execute within a fixed period of time is proportional to the number of processor cycles issued within this time period, and the number of processor cycles per unit of time is determined by the operating frequency.

Therefore, when scheduling is carried out based on processor time as in Japanese Patent Laid-open Publication No. 2009-110404, the virtual processors of multiple virtual computers may not be running proportional to the service ratios.

In Japanese Patent Laid-open Publication No. 2009-140157, technology for reducing the power consumption of the computer system is disclosed, but a method for solving the problem mentioned above related to virtual processor scheduling is not disclosed.

Accordingly, the objective of this invention is to have the virtual processors of virtual computers to utilize the physical processors proportionally to the values of "service ratios" assigned to each virtual computer.

The hypervisor calculates the sum of available processor cycles on a computer system within the period $T_1$. (Here, the period $T_1$ is called the initialization cycle.) This is calculated based on the sum of the operating frequencies of the respective physical processors and the initialization cycle $T_1$. Then the hypervisor calculates the value of "possessing cycles" for each virtual computer. "Possessing cycles" can be obtained by distributing the total number of processor cycles in proportion to the service ratios of each virtual computer. During the scheduling of virtual processors, the hypervisor runs each virtual processor of virtual computers on one of the physical processors based on the value of "possessing cycles" for each virtual computer.

This invention enables the utilization of physical processors to be more precise according to the proportion of the service ratios assigned to each virtual computer, compared to conventional methods based on the distribution of total processor time for one or more physical processors.

BRIEF DESCRIPTION OF THE DRAWINGS

FIG. 16 is a table showing the schedule priority of each virtual computer in chronological order;

FIG. 17 is a table showing the run-destination physical processor of each virtual computer in chronological order;

DETAILED DESCRIPTION

Figure 1:
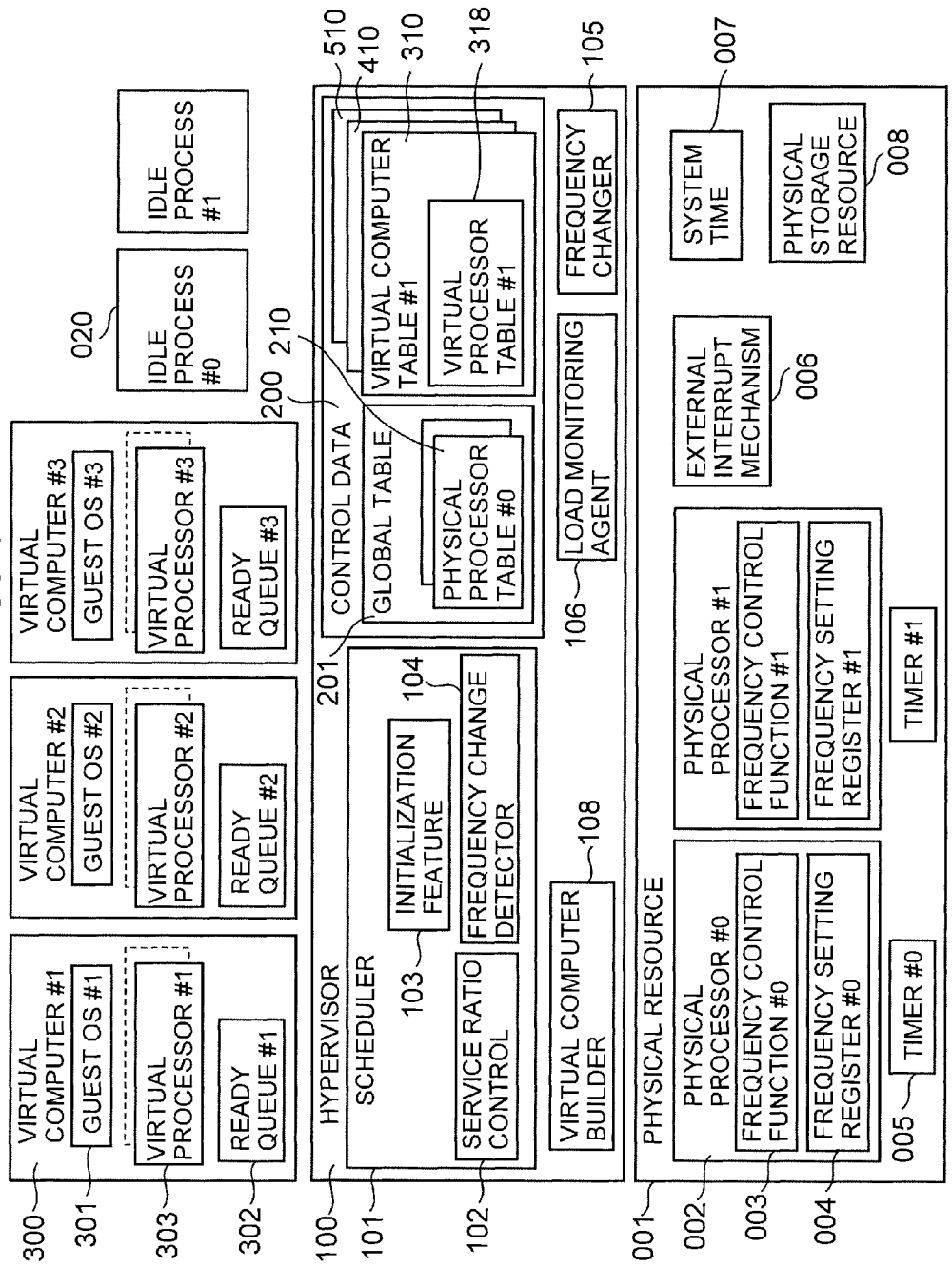
FIG. 1 is a block diagram showing a computer system related to an embodiment of this invention.

An embodiment of this invention will be explained below by referring to the drawings.

Furthermore, in the following explanation, various types of information may be explained using the expression "xxx table", but the various types of information may also be expressed using data structures other than tabled. To show that the information is independent of a data structure, "xxx table" may be referred as "xxx information".

Furthermore, in the following explanation, there may be cases where the processing of tasks is described as the "program" executing some task. The "program" can be processed by being executed on a processor while using a storage resource (for example, a memory) when required. For this reason, the features of processors can include some of the tasks or functions described within this invention. The processor can include a hardware circuit that executes either some part of or all of the processing tasks. The computer program may be installed in each of the respective computers from a program source. The program source, may be stored within a program distribution server or some storage medium.

Furthermore, in the following explanation, the same reference sign but different serial numbers are allotted to multiple elements of the same type. The serial numbers will be used in explanations where a distinction has to be made between multiple elements of the same type, and the reference signs will be used in explanations where no distinction is required between the multiple elements of the same type.

FIG. 1 is a block diagram showing a computer system related to an embodiment of this invention.

The computer system can consist from one or more physical computers, and, for example, can be a server apparatus. The computer system is comprised from physical resource 001, and a hypervisor 100 and multiple virtual computers 300 are executed on the physical resource 001. In this embodiment, there are three virtual computers #1 through #3, but the number of virtual computers 300 is not limited to three.

The physical resource 001 is comprised from one or more physical processors (physical processors) 002, one or more timers 005, an external interrupt mechanism 006, a system time 007, and a physical storage resource (for example, one or more physical memories) 008. There is one timer 005 attached to one physical processor 002. In this embodiment, there are two physical processors #0 and #1, and there are two timers #0 and #1, but neither of these numbers are limited to two.

The physical processor 002 can execute an operating system (for example, a general-purpose operating system). The physical processor 002 has a frequency control function 003 and a frequency setting register 004. The frequency control function 003 is for changing the operating frequency of the physical processor 002. Specifically, this function 003 (for example, #0) can change the operating frequency of the physical processor 002 (for example, #0) to an operating frequency that corresponds to a value that is set in the frequency setting register 004 (for example, #0). The voltage supplied to this physical processor 002 is also adjusted in accordance with the operating frequency of the physical processor 002. Lowering the operating frequency of the physical processor 002 makes it possible to reduced the consumption power for this physical processor 002.

The external interrupt mechanism 006 has a function asynchronously notifying the physical processor 002 occurrence of some events. The external interrupt mechanism 006, for example, is used to notify the physical processor 002 that the limit of timer 005 has been reached, triggering an inter-processor interrupt from one physical processor 002 to another physical processor 002. The mechanism 006 may be used for some another purpose or in addition to the one mentioned above.

The system time 007 is a device, that the hypervisor 100 uses to reference the current time and the elapsed time, and denotes the common time (the system time) of all the physical processors 002. The method for implementing the system time 007 will not be limited.

The timer 005 can issue an external interrupt. The external interrupt is notified to the physical processor 002 by the external interrupt mechanism 006 at either a specified time or a specified cycle. The timers #0 and #1 are used by the hypervisor 100 to utilize the physical processors #0 and #1 by time-sharing method using time slices.

The hypervisor 100 controls the physical resource 001, and generates multiple virtual computers 300. Each virtual computer 300, for example, has a ready queue 302 and a virtual processor 303. The number of operating virtual computers 300 can be increased by carrying out operations that generates or starts up a virtual computer 300. The number of virtual computers 300 can be reduced by operations that suspends or deletes a virtual computer.

The virtual processer 303 is a virtual processor that can be scheduled to one of the physical processors 002. According to FIG. 1, each virtual computer 300 has one virtual processor 303, but a virtual computer 300 may be comprised from more than one virtual processor 303. The ready queue 302 is a first-in-first-out data structure that is capable of storing multiple virtual processors 303. A virtual processor 303 fetch operation from the ready queue 302 is carried out from the head of the ready queue 302, and a virtual processor 303 insert operation to the ready queue 302 is carried out with respect to the end of the ready queue 302.

In the virtual computer 300, a general-purpose operating system (guest OS) 301 is executed by the virtual processor 303. An application program or other such program may also be executed on the guest OS 301. The number of virtual processors 303 in the virtual computer 300 may be changed dynamically.

The hypervisor 100 schedules the virtual processors #0 through #2 to the physical processors #0 and #1 by time-sharing scheduling. A program (for example, the guest OS 301) is executed on the virtual processor 303 in accordance with the virtual processor 303 being scheduled to the physical processor(s) #0 and/or #1.

The hypervisor 100 assigns a processor time, called a "time slice", to the virtual processor 303 when the virtual processor 303 is scheduled to either of the physical processors 002.

In this embodiment, the "workload" and "throughput" of the physical processor 002 are used in virtual processor scheduling in addition to the processor time of the physical processor 002. The workload and throughput will be explained hereinbelow by using the physical processor #0 as an example.

Figure 2:
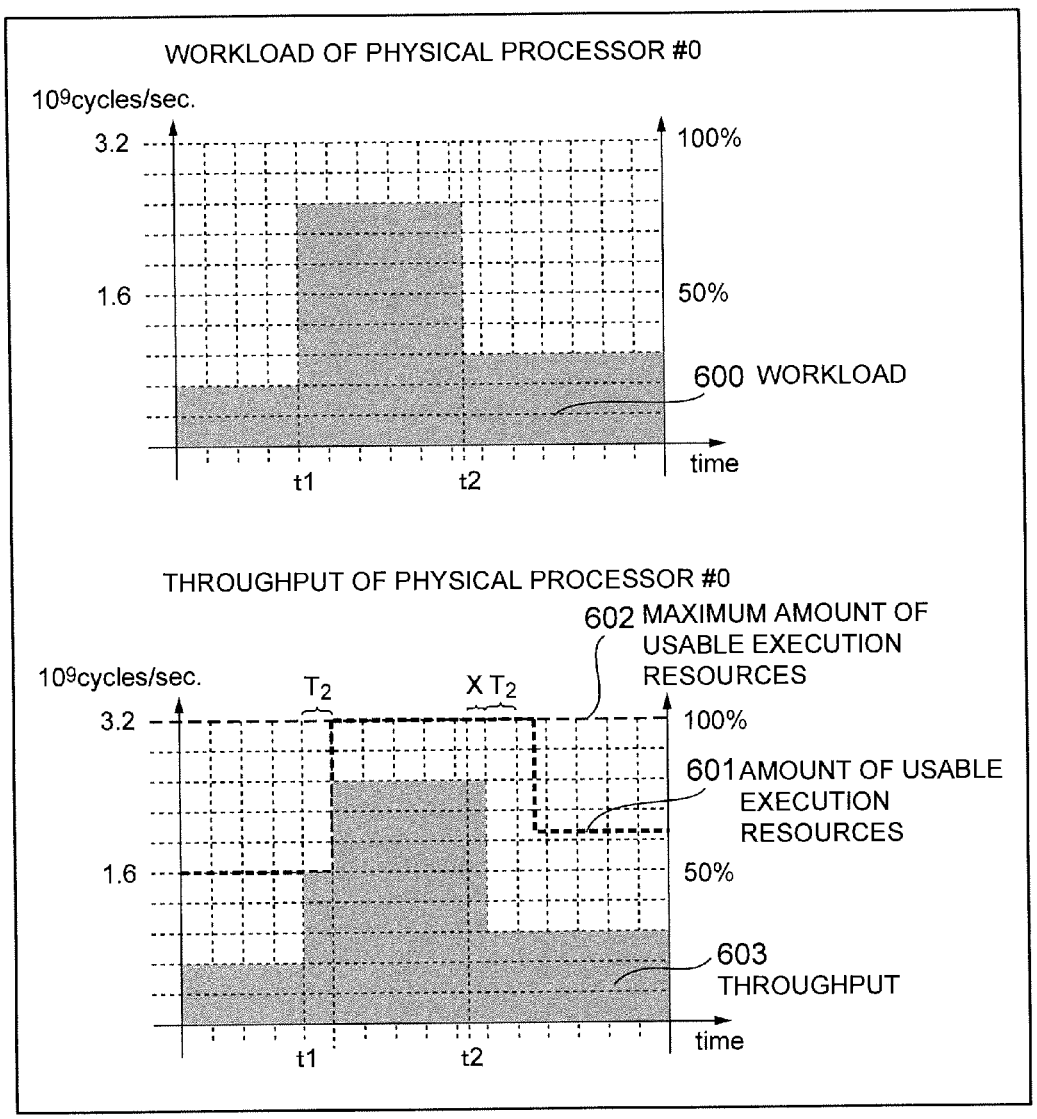
FIG. 2 shows a workload and a throughput of a physical processor #0.

FIG. 2 shows the workload and throughput of the physical processor #0.

The workload 600 is the amount of work that is assigned to the physical processor during a certain period of time. (Here, the workload 600 is measured using the number of processor cycles per second.) There will be some workload on the physical processor #0 when some kind of task is being processing (for example, the guest OS 301 is executed, or some application is running on the guest OS 301).

The amount of usable execution resources 601 is also defined. This amount 601 is the number of processor cycles available on a physical processor during a certain period of time. (Here, the amount 601 is measured by available processor cycles per second.) The amount 601 at a respective point of time depends on the operating frequency of the physical processor #0.

Another amount which is the maximum amount of usable execution resources 602 is also defined. This amount 602 is the maximum value of the processor cycles per unit of time that can be utilized in the physical processor #0. This amount 602 is equivalent to the amount of usable execution resources 601 when operating the physical processor #0 at the maximum operating frequency.

The throughput 603 is the number of processor cycles per unit of time actually being utilized by the physical processor #0 at a certain point in time when a certain workload 600 (the amount of work assigned to the physical processor cycles per unit time) exists. When the workload 600 does not exceed the size of usable execution resources 601 at a respective point of time, the workload 600 and the throughput 603 of the physical processor #0 will be equivalent. The greatest value that the throughput 603 can take at a respective point of time is equal to the amount of usable execution resources 601 at this point of time.

Refer to FIG. 1 once again.

The hypervisor 100 includes a virtual computer builder 108, a scheduler 101, a frequency changer 105, and a load monitoring agent 106, and manages control data 200. The control data 200, for example, is stored in a physical storage resource 008.

The virtual computer builder 108 constructs multiple virtual computers 300 with one or more virtual processors 303.

The scheduler 101 includes service ratio control 102, an initialization feature 103, and a frequency change detector 104. Because the scheduler 101 includes service ratio control 102, for example, the amount of usable execution resources 601 allocated to each virtual computer 300 can be determined in number of processor cycle units in accordance with the user-specified virtual computer and the service ratio thereof. The scheduler 101 controls the distribution of the time slices assigned to each virtual computer 300, distributing the number of processor cycles of the physical processor 002 in proportion to the service ratios. This will be described in detail further below.

The guest OS 301 may suspend the virtual processor 303 executing the guest OS 301 by issuing a request to this virtual processor 303 to switchover to the suspend mode prior to using up an assigned time slice. This may be caused by the fact that the virtual processor 303 is idle.

Since the virtual processor 303 is idle, the virtual processor 303 is disallocated from the physical processor 002 when entering the suspend mode. Other virtual processors 303 can be allocated to the physical processors 002 until the virtual computer 300 of this virtual processor 303 exits suspend mode. This makes it possible to use the one or more physical processors 002 efficiently.

The hypervisor 100 binds the idle process 020 with the physical processor 002. In this embodiment, there are idle processes #0 and #1. The idle process #0 is bound to the physical processor #0, and the idle process #1 is bound to the physical processor #1. When a virtual processor 303 schedulable to the physical processor 002 cannot be found, the hypervisor 100 executes the idle process 020 bound to this physical processor 002 until a schedulable virtual processor 303 is found.

The processor time of the physical processor 002 can be used by either the virtual processor 303 or the idle process 020. By finding the ratio of the time virtual processors 303 are running on each physical processor 002 during a fixed interval, the "time utilization ratio" can be obtained. If the operating frequency of the physical processor 002 is unchanged and the physical processor time utilization ratio is taken periodically, the increase/decrease of the physical processor time utilization ratio correspond to the fluctuations of throughput 603 on the physical processor 002 over time.

In this embodiment, as described hereinabove, three virtual computers 300 exist, and each virtual computer 300 has one virtual processor 303. There are two physical processors 002, and these processors 002 are shared by the multiple virtual computers 300 using time-sharing. In the following explanation, alphabetical reference signs and mathematical formulas will be employed when required. In the formulas and alphabetical reference signs used, i denotes the virtual computer number (serial number), and j denotes the physical processor number (serial number). The virtual computer number i is an integer starting from 1, and the physical processor number j is an integer starting from 0. Specifically, in this embodiment, a values assignable to i are 1, 2 or 3. Values assignable to j are either 0 or 1.

The control data 200 are comprised of various types of indicators and parameters that are used by the functions 101, 105, 106, and 108. The control data 200 is generated and updated by the hypervisor 100 based on the configuration of the computer system (for example, the number of physical processors 002, the number of virtual computers 300, and the number of virtual processors 303). The control data 200 includes a global table 201 and a virtual computer table 310. There is a table 310 for each virtual computer 300. In this embodiment, there are three virtual computers 300. Therefore the number of tables 310 is three.

Figure 3:
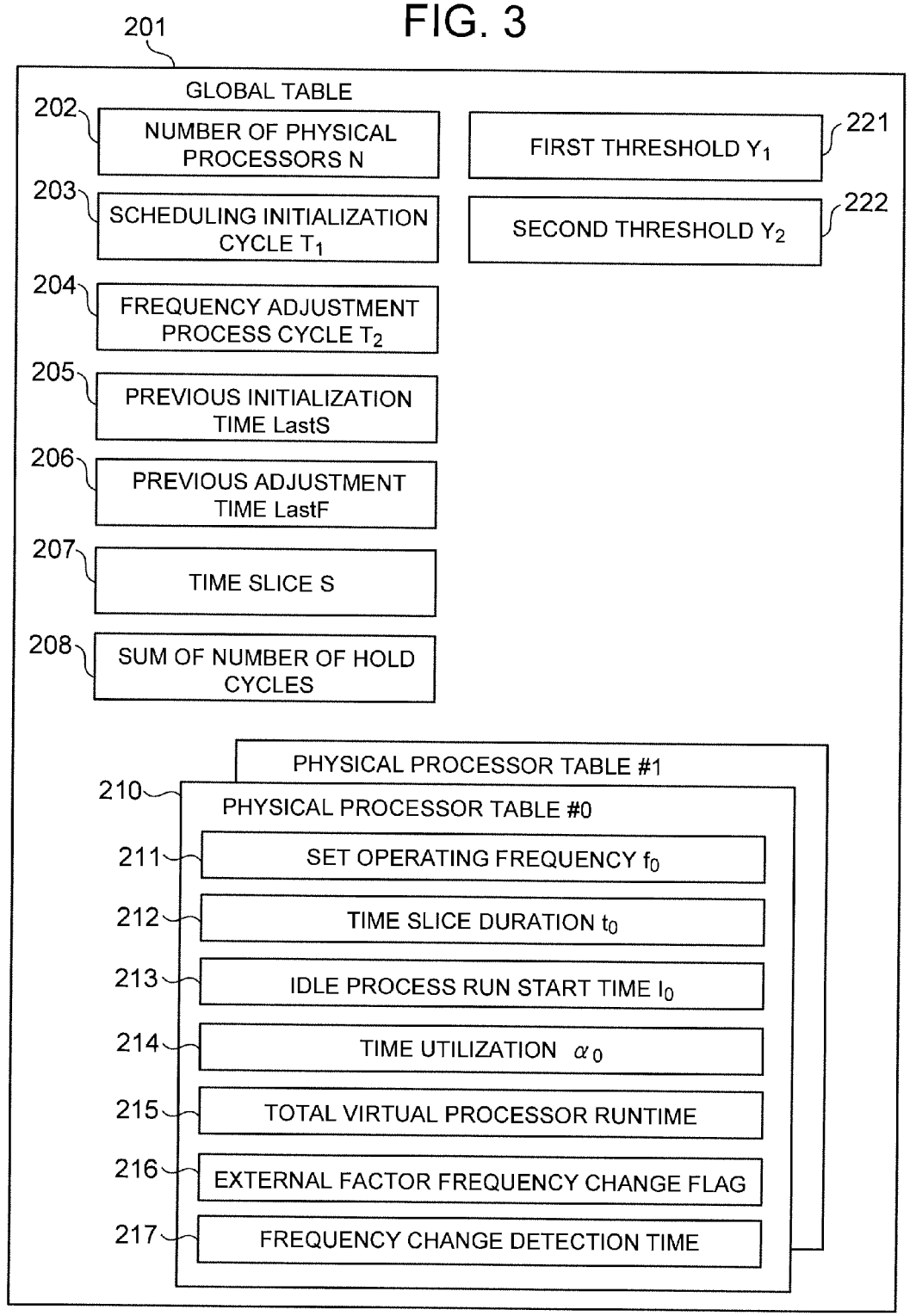
FIG. 3 shows the configuration of a global table 201.

FIG. 3 shows the configuration of the global table 201.

The global table 201 is shared by multiple physical processors 002, and, for example, includes the following information:

information 202 denoting the number N of physical processors;

information 203 denoting the scheduling initialization cycle $T_1$;

information 204 denoting the adjustment cycle $T_2$, which is the cycle of a frequency adjustment process;

information 205 denoting the previous initialization time LastS, which is the most recent time at which scheduling initialization was performed;

information 206 denoting the previous adjustment time LastF, which is the most recent time at which the frequency adjustment process was performed;

information 207 denoting the time slice S in units of processor cycles;

information 208 denoting the sum of the value, "possessing cycles";

information 221 denoting the first threshold $Y_1$;
information 222 denoting the second threshold $Y_2$; and
the physical processor table 210, which is a table that stores information related to a corresponding physical processor 002.

There is a physical processor table 210 for each physical processor 002. In this embodiment, since there are two physical processors 002, there are also two of the tables 210. A physical processor table j210, for example, include the following information:

information 211 denoting the operating frequency $f_j$ set for the physical processor #j;
information 212 denoting a time slice duration $t_j$ provided from the physical processor #j;
information 213 denoting a start time $I_j$ at which an idle process #j started to run on the physical processor #j;
information 214 denoting the time utilization ratio $\alpha_j$ of the physical processor #j;
information 215 denoting the total time that virtual processors 303 has ran on the physical processor #j;
a change flag 216 denoting whether the frequency is changed by an external factor or not; and
information 217 denoting the time when a change in the operation frequency of the physical processor #j was detected.

Figure 4:
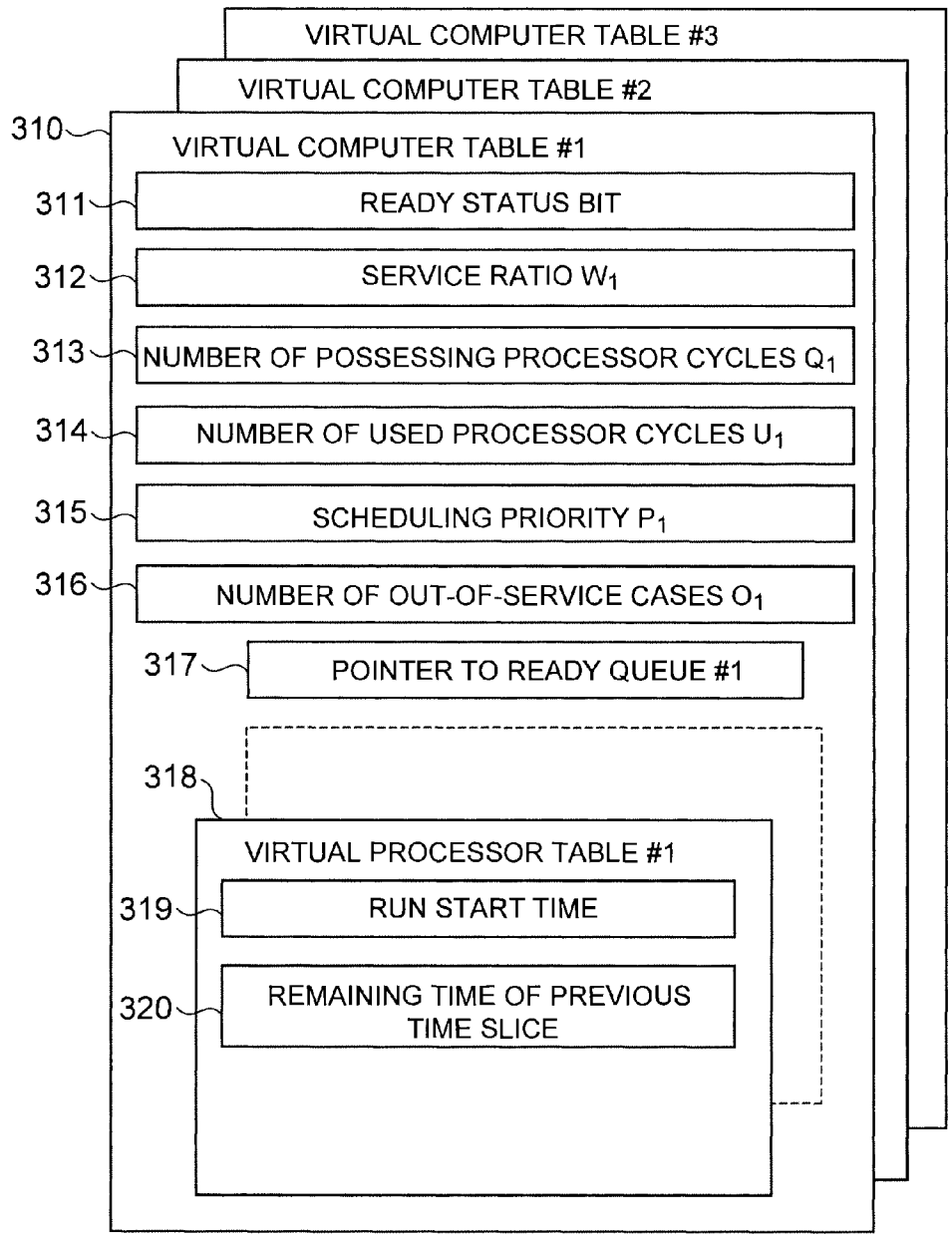
FIG. 4 shows the configuration of a virtual computer table 310.

FIG. 4 shows the configuration of the virtual computer table 310.

A virtual computer table 1310 comprises information related to a virtual computer #i, for example, the following information:

the ready status bit 311, which is a bit denoting whether the virtual computer #i is in ready status or not;
information 312 denoting the service ratio $W_i$ of the virtual computer #i;
information 313 denoting the number of possessing processor cycles $Q_i$ of the virtual computer #i;
information 314 denoting the number of processor cycles $U_i$ used by the virtual computer #i;
information 315 denoting the scheduling priority $P_i$ of the virtual computer #1;
information 316 denoting the number of times $O_i$ the virtual computer #i was out-of-service;
a pointer 317 to the ready queue #i; and
a virtual processor table 318 comprised of information related to a corresponding virtual processor.

When the ready status bit 311 is ON (1), the virtual computer #i is in ready status, and when OFF (0), the virtual computer #i is not in ready status.

There is a virtual processor table 318 for each virtual processor 303 of the virtual computer #i. In this embodiment, since there is one virtual processor 303 in each virtual computer #i, the number of table 318 is also one. The virtual processor table 318, for example, includes the following information:

information 319 denoting the time when the dispatch of the virtual processor started; and
information 320 denoting the remaining time of the previous time slice.

Refer to FIG. 1 once more.

The load monitoring agent 106 carries out the following tasks for each physical processor 002 at each fixed cycle $T_2$. The agent 106 collects the time utilization factor $\alpha_j$ of the physical processor #j, and stores information denoting the collected time utilization factor $\alpha_j$ in the physical processor table #j.

The frequency changer 105 carries out the following tasks for each physical processor 002. The frequency changer 105 either raises, lowers, or unchanges the operating frequency of the physical processor #j based on the physical processor time utilization factor $\alpha_j$ collected by the load monitoring agent 106.

The frequency change detector 105 is able to detect that the operating frequency of the physical processor #j has been changed due to external factors, and to sets the flag 216 in a physical processor table #j to ON (1). When this frequency change is detected, the feature 105 is also able to initialize the scheduling and maintain the accuracy of the service ratio control. One possible application of this feature is acquiring the operating frequency of each physical processor #j when specific interrupt signals used for power capping is detected. In this case, the new operating frequency is compared with the operating frequency $f_j$ value stored in the physical processor table #j. However, the method is not limited thereto, and other methods can be employed.

As previously mentioned, there may be cases when the operating frequencies of the physical processors in the computer system are different. For example, there are cases when the computer system consists of multiple physical processors and the operating frequencies of these multiple physical processors differ. When this situation can occur on a homogeneous system comprised of uniform physical processors. This situation can also occur on heterogeneous systems where a single system consists of different physical processors of various performances and designs. Furthermore, even when the computer system has only one physical processor, there can be cases where this physical processor is able to adjust the operating frequency, the operating frequency at a first point of time may differ from the operating frequency at a second point of time.

The number of instructions that a physical processor is able to execute within a fixed period of time is proportional to the number of processor cycles that is triggered within this time period, and the number of processor cycles per unit time is determined by the operating frequency. For this reason, when operating frequencies differ, the number of instructions that can be executed per unit of time will also differ.

It is supposed here that the ratio of the virtual computer service ratios is #1:#2:#3=5:3:2.

According to conventional scheduling, the processor time is the only quantity used to measure the amount of physical processor execution resources.

Figure 7:
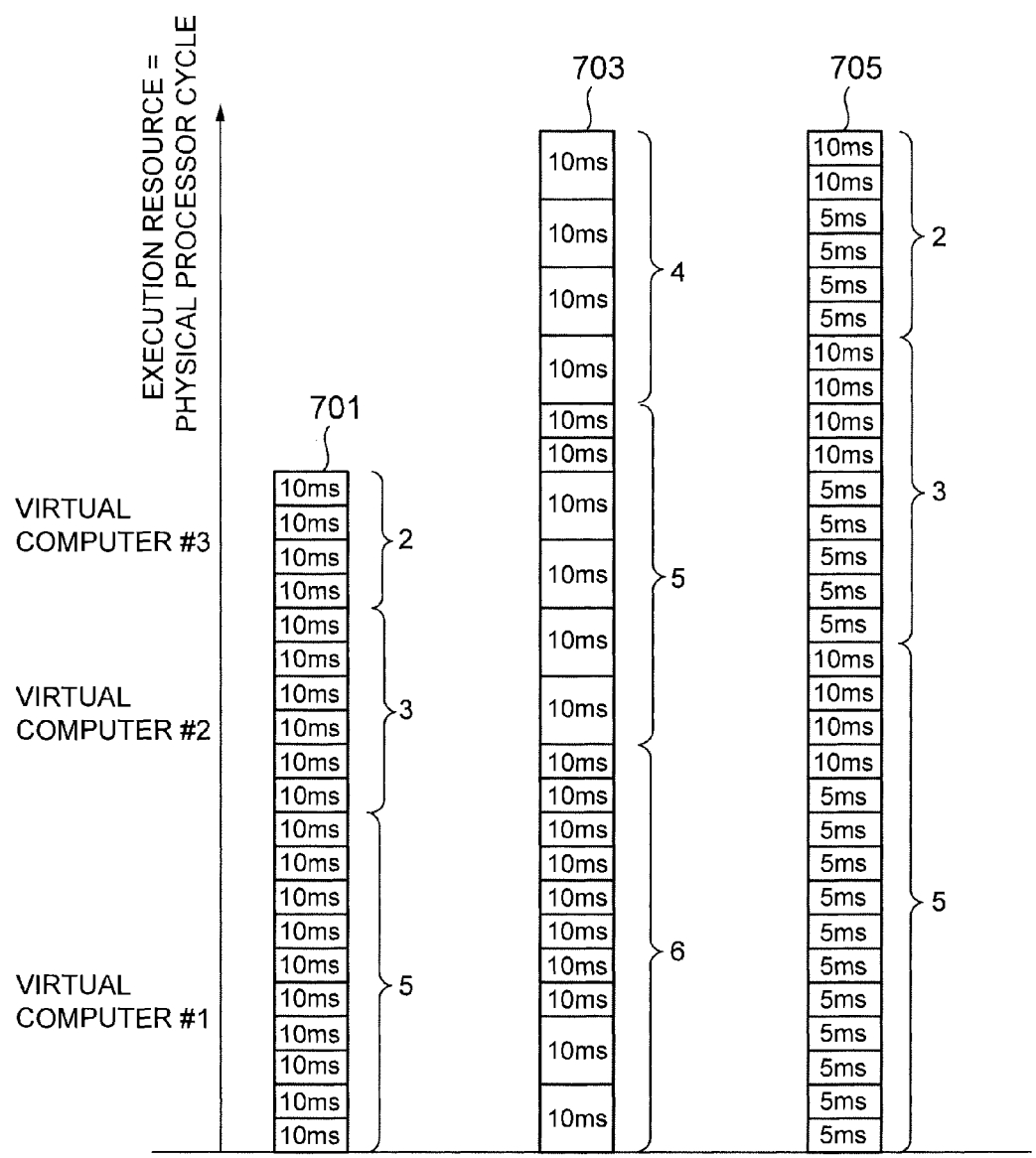
FIG. 7 shows the difference between the results of conventional scheduling and the results of the scheduling related to an embodiment of the present invention.

In a case where the operating frequencies of multiple physical processors are uniform within a homogeneous system, as shown in the left side of the stacked bar graph 701 of FIG. 7, the execution resources of the physical processor are distributed so as to be proportional to the service ratios of the virtual computers even in conventional scheduling.

Figure 5:
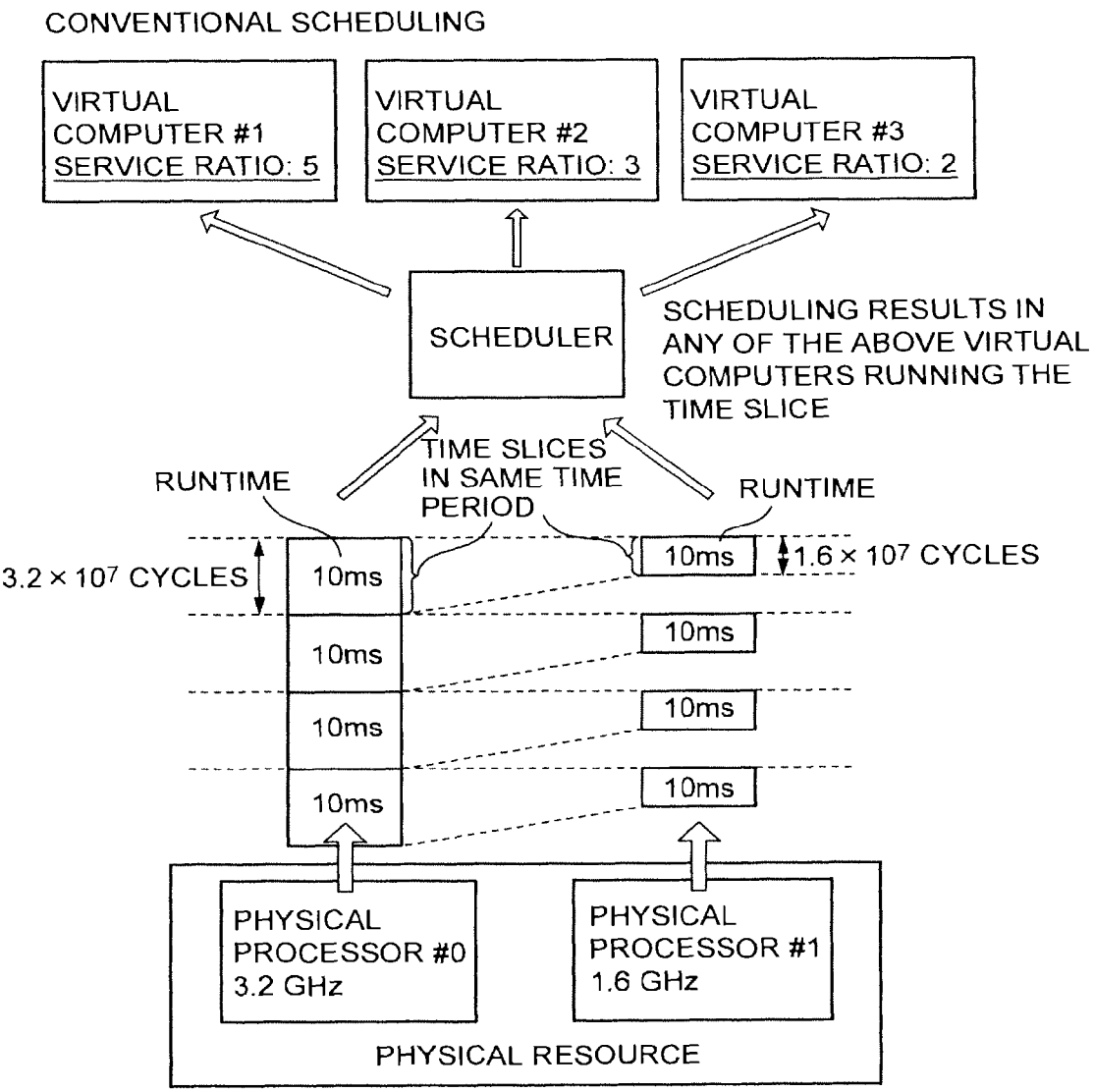
FIG. 5 is a conceptual diagram of a time slice in accordance with conventional scheduling.

However, in a case where the operating frequencies of the physical processors differ, the physical processor execution resources are not distributed in proportion to the service ratios of the virtual computers in conventional scheduling. Specifically, there may be cases where the maximum number of instructions that can be executed during a time slice of fixed-time length is not the same, depending on which physical processor is used. This occurs because, as shown in FIG. 5, when the operating frequency differs depending on the physical processor, the number of processor cycles that can be utilized will differ according to which physical processor is used even though the time slices of the same duration are assigned. For this reason, as shown in the stacked bar graph 703 in the center of FIG. 7, the ratio of the number of instructions capable of being executed on the virtual computers #1 through #3 may differ from the ratio of the service ratios. For this reason, the accuracy of the service ratio control is lost.

Accordingly, in this embodiment, the scheduler 101 calculates the number of processor cycles instead of the processor time, and distributes the execution resources to the multiple virtual computers based on the number of processor cycles. For this reason, the possessing time is replaced by the possessing processor cycles. The number of processor cycles has a proportional relation to the number of instructions that can be executed on the physical processor.

Figure 6:
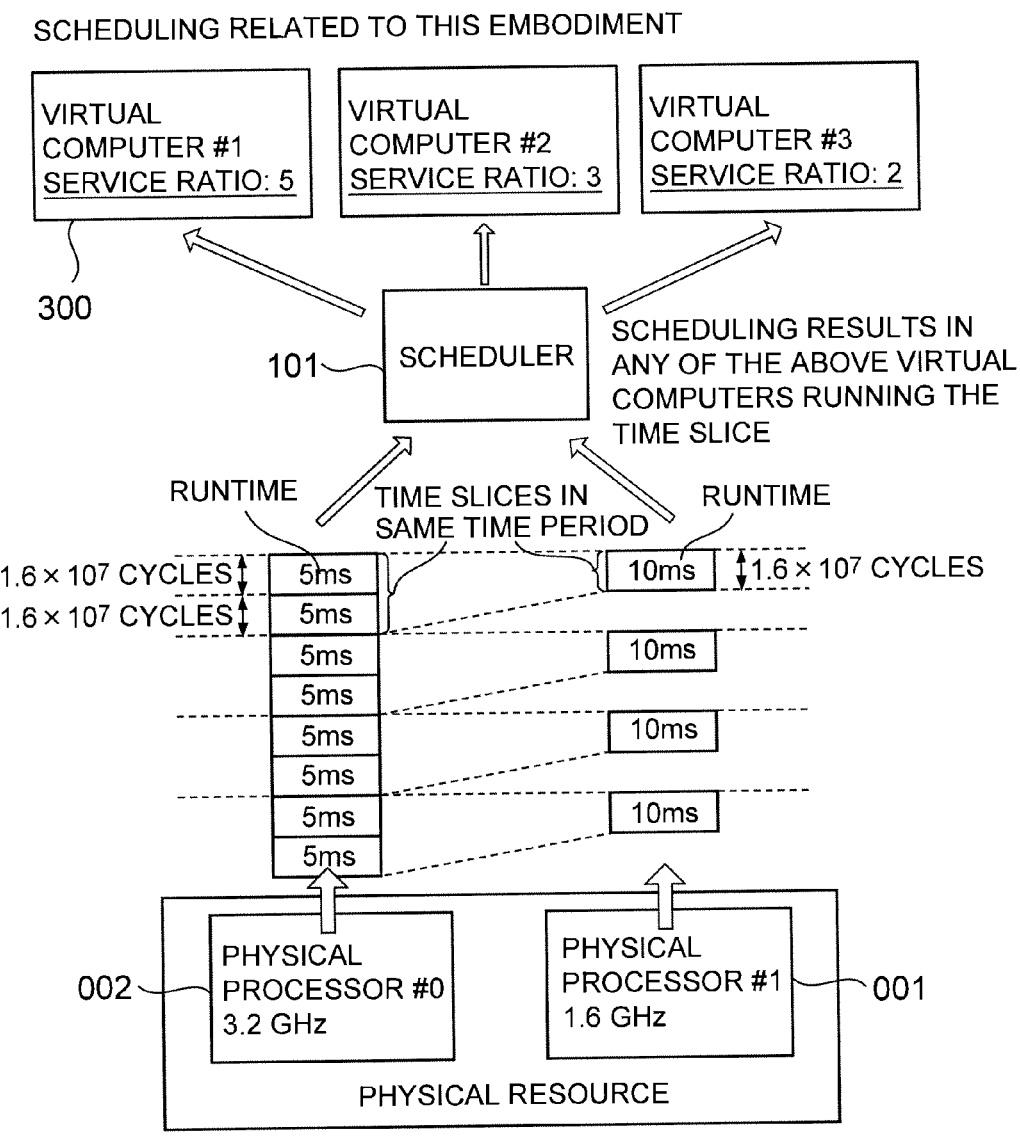
FIG. 6 is a conceptual diagram of a time slice in accordance with scheduling related to an embodiment of the present invention.

Furthermore, as shown in FIG. 5, time slices that are assigned by conventional scheduling are a fixed duration for the respective physical processors, but time slices assigned using this embodiment, as shown in FIG. 6, are a fixed number of processor cycles on the respective physical processors. To keep the number of processor cycles per time slice constant regardless of which physical processors is used, the duration of the time slice is adjusted in accordance with the operating frequency of the physical processor. In the example shown in FIG. 6, the time slices S assigned by number of processor cycles are set to S=1.6×10$^7$ cycles. For this reason, the durations of the time slices of the 3.2 GHz physical processor #0 and the 1.6 GHz physical processor #1 are adjusted to 5 ms (milliseconds) and 10 ms, respectively, so that the same number of processor cycles is used no matter which physical processor is used.

In this way, scheduling related to this embodiment distributes the number of processor cycles. For this reason, the number of instructions capable of being executed during all the time slices is fixed, and as shown in the stacked bar graph 705 on the right side of FIG. 7, the ratio of the number of virtual computer executable instructions is maintained as a proportion of the service ratios of the virtual computers even in a case where a physical processor that is able to adjust the operating frequency is used.

Furthermore, according to this embodiment, the time utilization ratio of each physical processor is periodically checked, and the operating frequency of the physical processor is lowered during a time period when the throughput of the physical processor is low. This makes it possible to reduce the power consumption of the computer system. Furthermore, this function, which is compatible with scheduling that is based on the number of processor cycles, will be explained hereinbelow.

Figure 8:
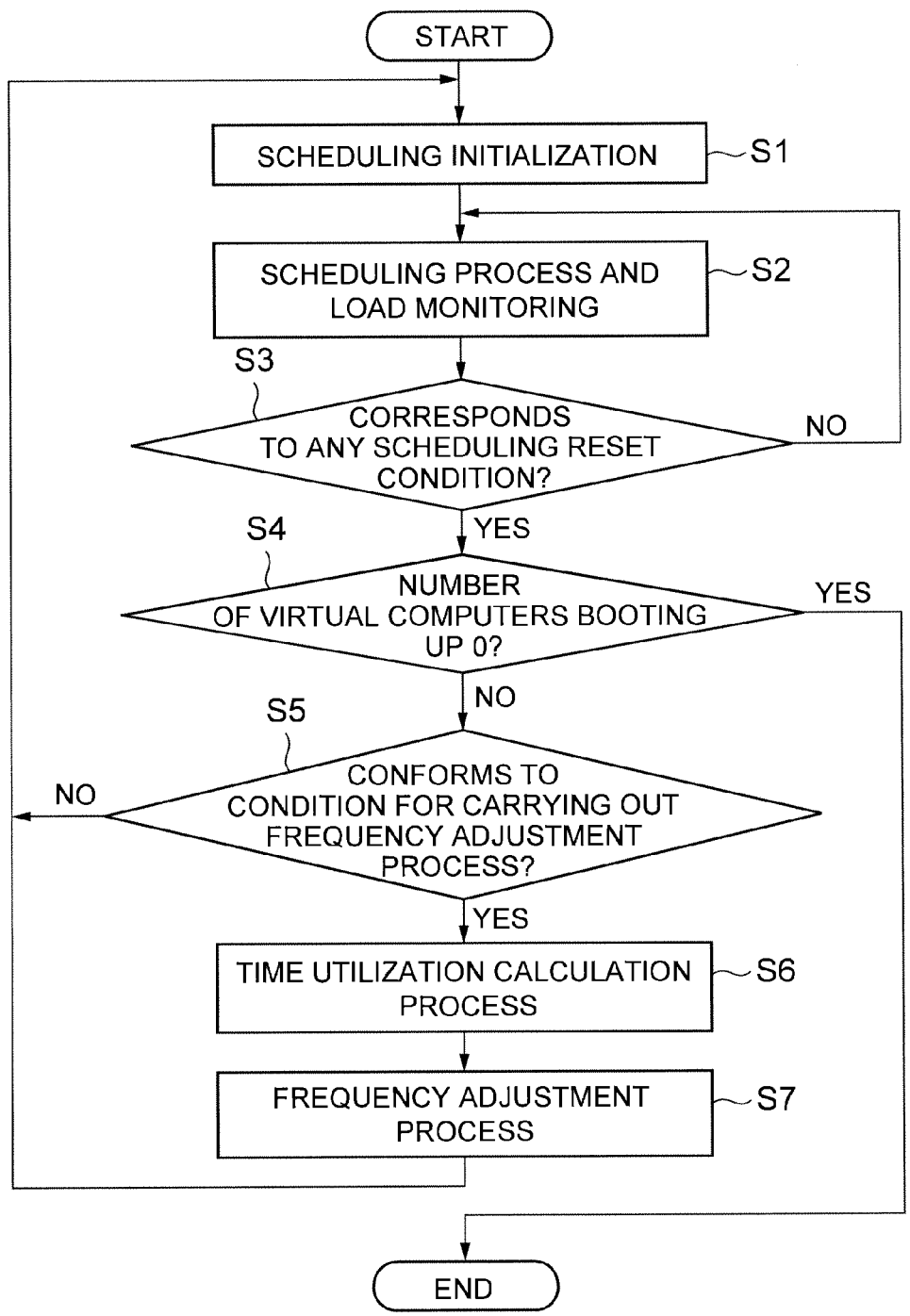
FIG. 8 is a flowchart of overall processing.

FIG. 8 is a flowchart of the overall processing performed by the computer system related to this embodiment. The invocation conditions for the overall processing, for example, are that the computer system be up and running, and that at least one virtual computer be in the process of booting up.

In Step S1, the initialization function 103 carries out a scheduling initialization process.

In Step S2, the scheduler 101 carries out scheduling tasks for each physical processor 002, and, in addition, the load monitoring function 106 carries out load monitoring for each physical processor 002. The load monitoring function 106 totalizes the sum of the virtual processor runtimes in a physical processor #j for each physical processor 002, and records information 215 denoting this sum in a physical processor table #j.

In Step S3, a decision is made as to whether or not the result of Step S2 corresponds to any scheduling initialization condition. When the result of this decision is affirmative (S3: YES), Step S4 is carried out, and when the result of this determination is negative (S3: NO), Step S2 is carried out.

In Step S4, a decision is made as to whether or not the number of virtual computers 300 in the process of booting up is 0. Since the start condition for overall processing is that at least one virtual computer 300 be in the process of booting up, in a case where booting virtual computers 300 do not exist (S4: YES), the overall processing ends. In a case where even one virtual computer 300 has been booted up, the overall processing resumes. In a case where there is one or more virtual computers 300 in the process of booting up (S4: NO), Step S5 is carried out.

In Step S5, a decision is made at to whether or not the result of Step S2 conforms to a condition for carrying out a frequency adjustment process. When the result of this decision is affirmative (S5: YES), Step S6 is carried out. Alternatively, when the result of this decision is negative (S5: NO), Step S1 is carried out. Specifically, for example, the determination result of S5 is affirmative when the passage of an adjustment cycle $T_2$ since the last adjustment time LastF is detected based on the system time.

In Step S6, a time utilization factor calculation process is carried out. The time utilization factor $\alpha_3$ is calculated at this point.

In Step S7, the frequency changer 105 carries out a frequency adjustment process. The time utilization factor $\alpha_j$ calculated in Step S6 is used in the frequency adjustment process.

The initialization feature 103 is always executed prior to the start of the scheduling process of Step S2. Furthermore, the initialization feature 103, for example, can be invoked by having the following conditions (1) through (4) acting as a trigger:

(1) A case when an initialization cycle $T_1$ has elapsed since the initialization function 103 was most recently invoked;
(2) A case when either of the ratios within the virtual computer 300 service ratios has been changed (for example, a case in which the user changes any of the virtual computer service ratios);
(3) a case when either a virtual computer creation or deletion was performed; and
(4) a case when the change of operating frequency in any of the physical processor is changed by an external factor.

The preceding has been an overview of the overall processing. Each step of the overall processing will be explained in detail below.

<Initialization Process (Step S1 of FIG. 8)>

Figure 9:
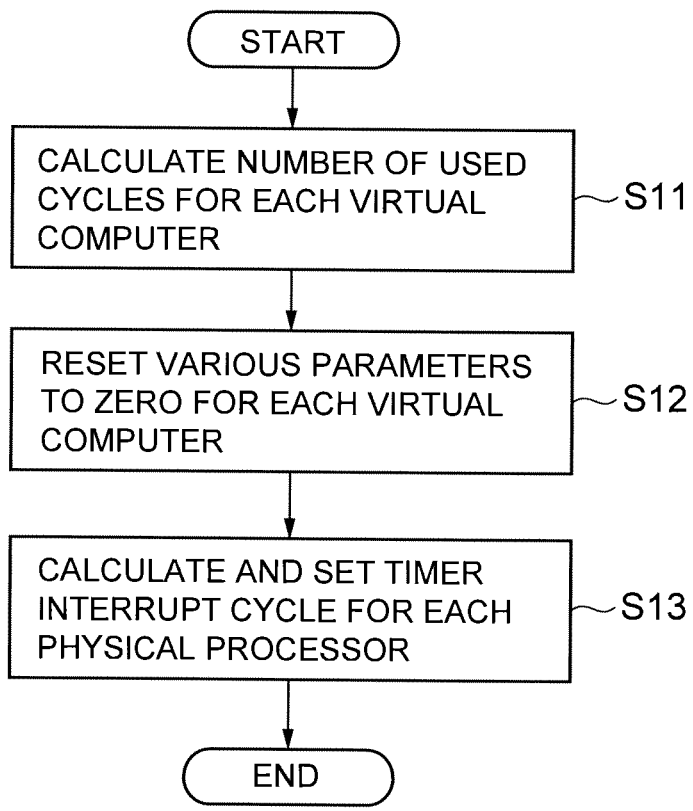
FIG. 9 is a flowchart of a scheduling initiation process.

FIG. 9 is a flowchart of the scheduling initialization process.

In Step S11, the initialization feature 103 calculates the number of hold cycles of each virtual computer 300.

In Step S12, the initialization feature 103 resets the various parameters inside the control data 200 to zero.

In Step S13, the initialization feature 103 sets the duration of the time slice for each physical processor 002.

Each step will be explained in detail below.

<<Calculation of Number of Virtual Computer Hold Cycles (Step S11 of FIG. 9)>>

In this initialization process, Step S11, that is, the calculation of the number of possessing cycles of each virtual computer 300, for example, is carried out as follows.

It is supposed that $W_i$ is the service ratio of the virtual computer #i and that $f_j$ is the operating frequency of the physical processor #j. The sum W of the service ratios of all the virtual computers 300 is obtained as shown in Formula 1 below. Furthermore, the sum F of the operating frequencies of all the physical processors 002 is obtained as shown in Formula 2 below.

$$W = W_1 + W_2 + \ldots = \Sigma W_i \qquad \text{[Formula 1]}$$

$$F = f_1 + f_2 + \ldots = \Sigma f_j \qquad \text{[Formula 2]}$$

When determining the product of the sum F of the operating frequencies of all the physical processors 002 and the scheduling initialization cycle $T_1$ (F×T1) here, the total amount of execution resources capable of being used in the computer system (=K) is determined in number of cycles. That is, the total number of processor cycles K is calculated. The amount of execution resources that the virtual computer #i can have is equivalent to K×$W_i$/W. Therefore, the number of possessing cycles (the number of processor cycles that the virtual computer #i can use) $Q_i$, which is the amount of execution resources that the virtual computer #i can consume, is obtained as shown in Formula 3 below.

$$Q_i = T_1 \times F \times (W_i/W) \quad \text{[Formula 3]}$$

Figure 10:
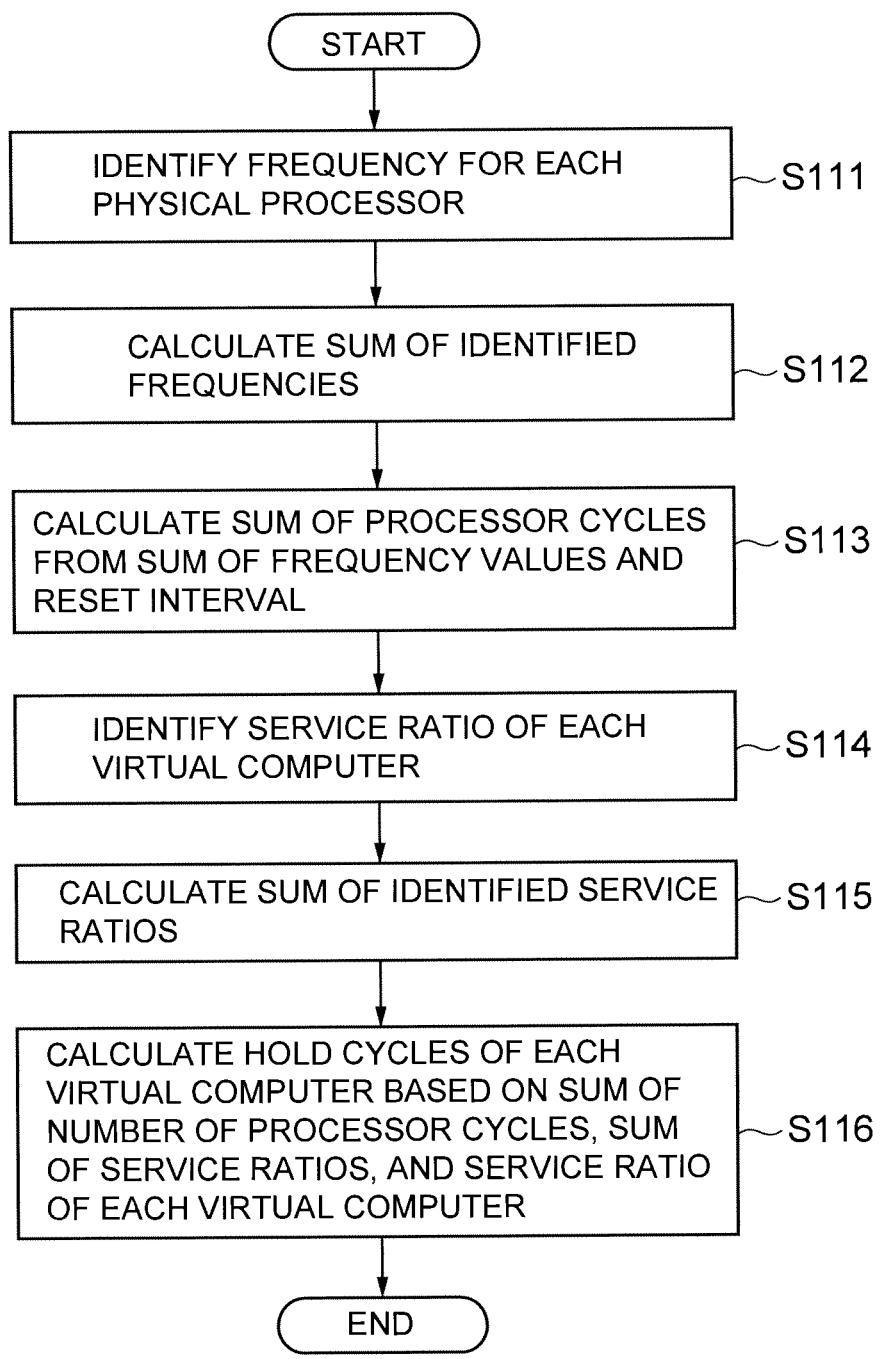
FIG. 10 is a flowchart of a process for calculating the number of hold cycles.

FIG. 10 is a flowchart of the process for calculating the number of hold cycles.

In Step S111, the initialization function 103 identifies the set operating frequency $f_j$ of the physical processor #j from the physical processor table #j for each physical processor 002.

In Step S112, the initialization function 103 calculates the sum (F (see Formula 2)) of all the $f_j$s identified in Step S111.

In Step S113, the initialization function 103 calculates the sum of the number of processor cycles ($T_1 \times F$). That is, the product of the sum F of the set operating frequencies and the scheduling initialization cycle $T_1$ is calculated.

In Step S114, the initialization feature 103 identifies the service ratio $W_i$ of the virtual computer #i from the virtual computer table #i for each virtual computer 300.

In Step S115, the initialization feature 103 calculates the sum (W (Refer to Formula 1)) of all the $W_i$s identified in Step S114.

In Step S116, the initialization feature 103 uses the sum ($T_1 \times F$) of the number of processor cycles, the sum W of the service ratios, and the service ratio $W_i$ of the virtual computer #i for each virtual computer 300, and calculates the number of possessing cycles $Q_i$ of the virtual computer #i for each virtual computer 300 in accordance with the above-mentioned Formula 3.

<<Zero Reset of Various Parameters (Step S12 of FIG. 9)>>

In the zero reset of various parameters, the initialization function 103 resets the value of a parameter used in the scheduling function 101 to 0. Specifically, the initialization function 103 resets the following values; the number of used cycles of the virtual computer #i (the number of processor cycles used by the virtual computer #i) $U_i$, the number of out-of-service times $O_i$, and the schedule priority $P_i$ all to 0.

<<Setting Time Slice Duration (Step S13 of FIG. 9)>>

Time-sharing of physical processor time is realized by using the timer interrupt issued to the physical processor 002 as a process suspend condition. The duration of a time slice can be adjusted in accordance with changing the period at which the timer #j, which corresponds to the physical processor #j, issues a timer interrupt. In this way it is possible to adjust the duration of the time slice.

Figure 11:
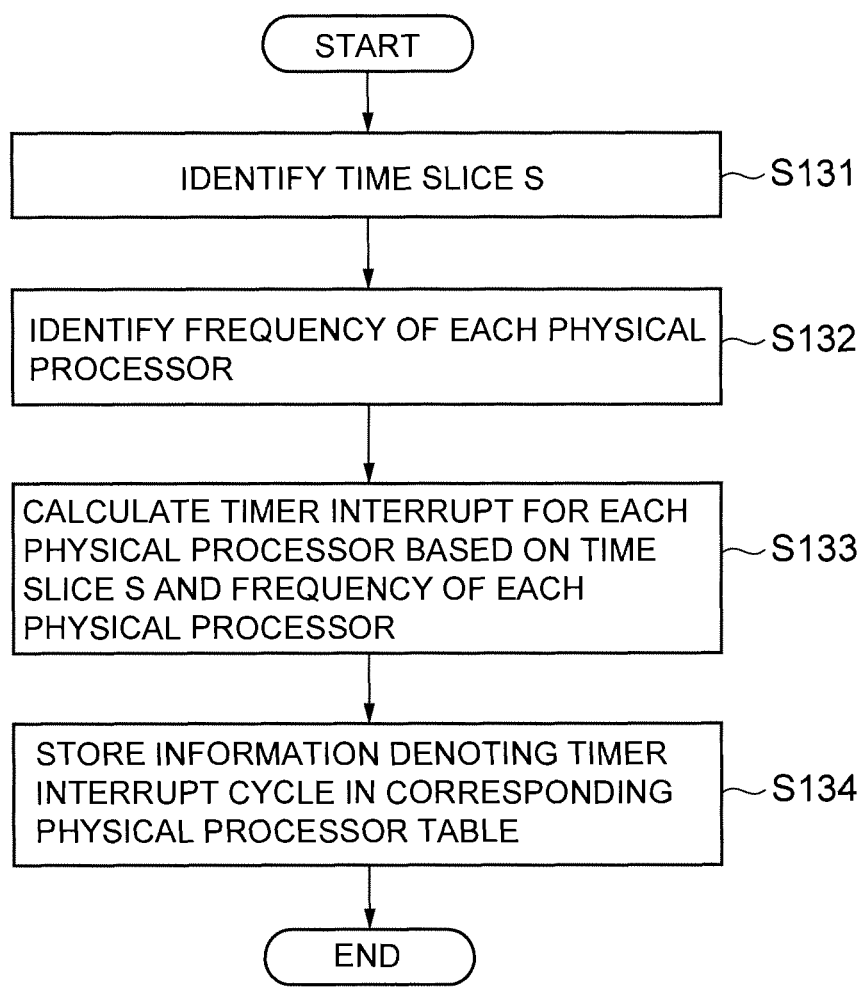
FIG. 11 is a flowchart of a time slice duration setting.

FIG. 11 is a flowchart of the time slice duration setting.

In this embodiment, the time slice S is expressed as the number of processor cycles, and is controlled so that the number of processor cycles able to be used in each time slice is constant regardless of the operation frequency of the physical processor.

In Step S131, the initialization feature 103 identifies the time slice S from the global table 201. A unit of time must be used when setting the timer interrupt cycle for a timer #j.

In Step S132, the initialization feature 103 identifies the operating frequency of the physical processor #j from the physical processor table #j for each physical processor 002.

In Step S133, the initialization function 103 calculates the time slice duration $t_j$ of the physical processor #j in accordance with Formula 4 below. That is, a time slice S in units of number of cycles is divided by the set operating frequency $f_j$ of the physical processor #j.

$$t_j = S/f_j \quad \text{[Formula 4]}$$

In Step S134, the initialization feature 103 stores the time slice duration $t_j$ calculated in Step S133 into the physical processor table #j corresponding to the physical processor #j for each physical processor 002.

<Scheduling Process (Step S2 of FIG. 8) and Initialization Condition Determination Process (Step S3 of FIG. 8)>

Figure 12:
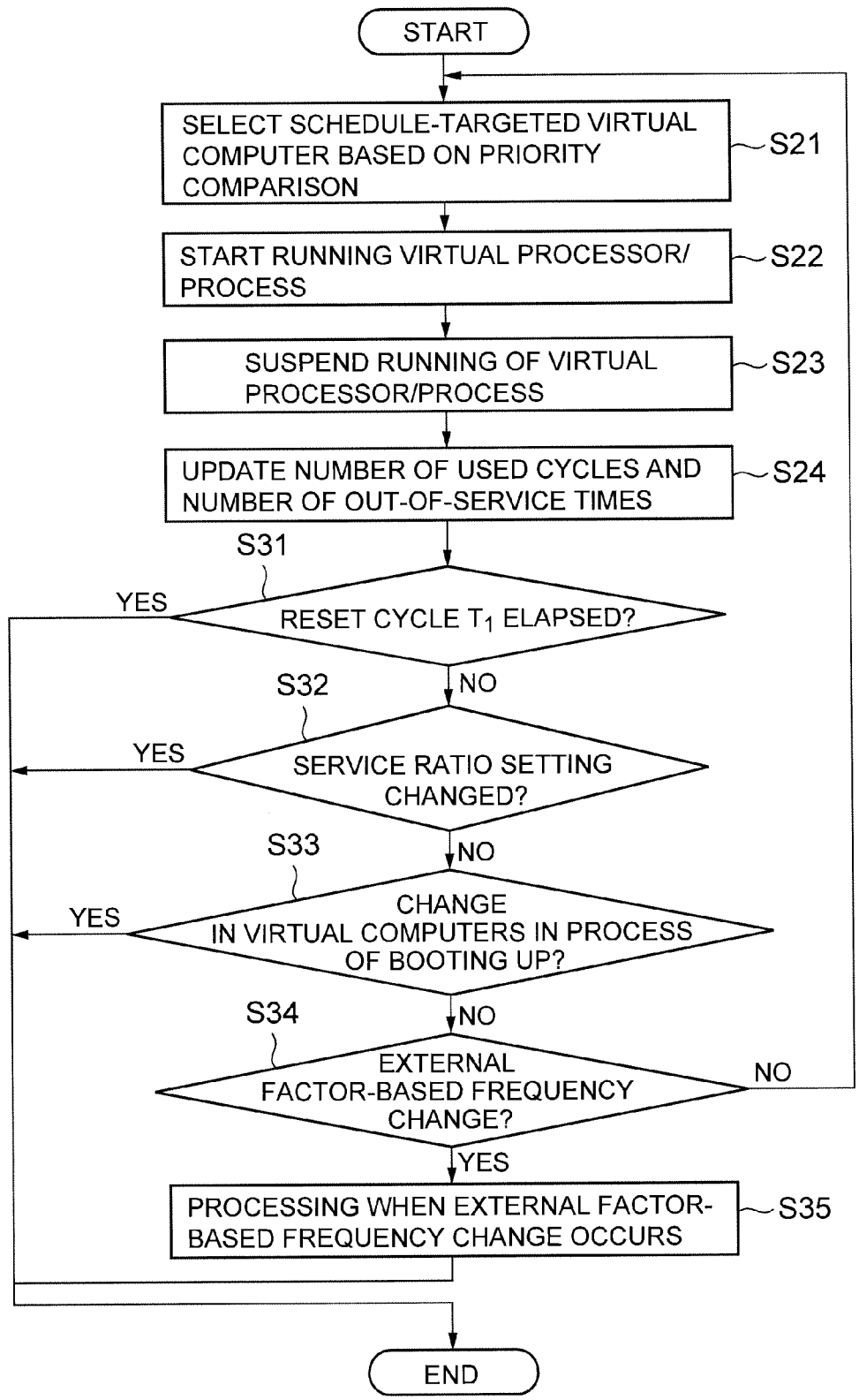
FIG. 12 is a flowchart of a process that comprises a scheduling process and an initiation condition determination process.

FIG. 12 is a flowchart of processing comprising a scheduling process and an initialization condition determination process. The scheduling process is carried out by the scheduling function 101.

The scheduling process is comprised of four ordinary steps. The initialization condition determination process is comprised of four decisions and processing step (Step S35) when a frequency change occurs as the result of an external factor. The four ordinary processes include a priority comparison (Step S21), running virtual processors (Step S22), suspending virtual processors (Step S23), and an update of the number of used cycles and the number of out-of-service times (Step S24). The four decisions include the determination of lapse of initialization cycle T (Step S31), the determination of presence/absence of service ratio setting change (Step S32), the determination of presence/absence of change in the number of virtual computers (Step S33), and the determination of presence/absence of frequency change due to external factors (Step S34).

The scheduling process shown in FIG. 12 is applied to each physical processor 002. By sharing each physical processor 002 in a time-sharing manner, the processor cycles of the physical processors 002 are distributed to multiple virtual computers 300 in proportion to the service ratios of the virtual computers 300.

The schedule priority $P_i$ of the virtual computer #i is defined and used as the criteria for a priority comparison. The number of times that the virtual computer #i uses up the number of possessing cycles $Q_i$ is the number of out-of-service times O. The schedule priority $P_i$ is calculated in accordance with Formula 5 below. That is, the number of used cycles $U_i$ of the virtual computer #i is divided by the number of possessing cycles $Q_i$, and, in addition, the number of out-of-service times $O_i$ is added.

$$P_i = U_i/Q_i + O_i \quad \text{[Formula 5]}$$

The virtual computer with a lower schedule priority value $P_i$ is preferred compared to one with a higher value. After thr virtual computer is selected, the virtual processor inside this selected virtual computer runs on the physical processor. Furthermore, when there are multiple virtual computers having equivalent priorities, a decision is made so that the virtual computer with either a larger virtual computer number or a smaller virtual computer number is preferentially selected.

<<Processing From Priority Comparison to Run Virtual Processor (Steps S21 and S22 of FIG. 12)>>

Figure 13:
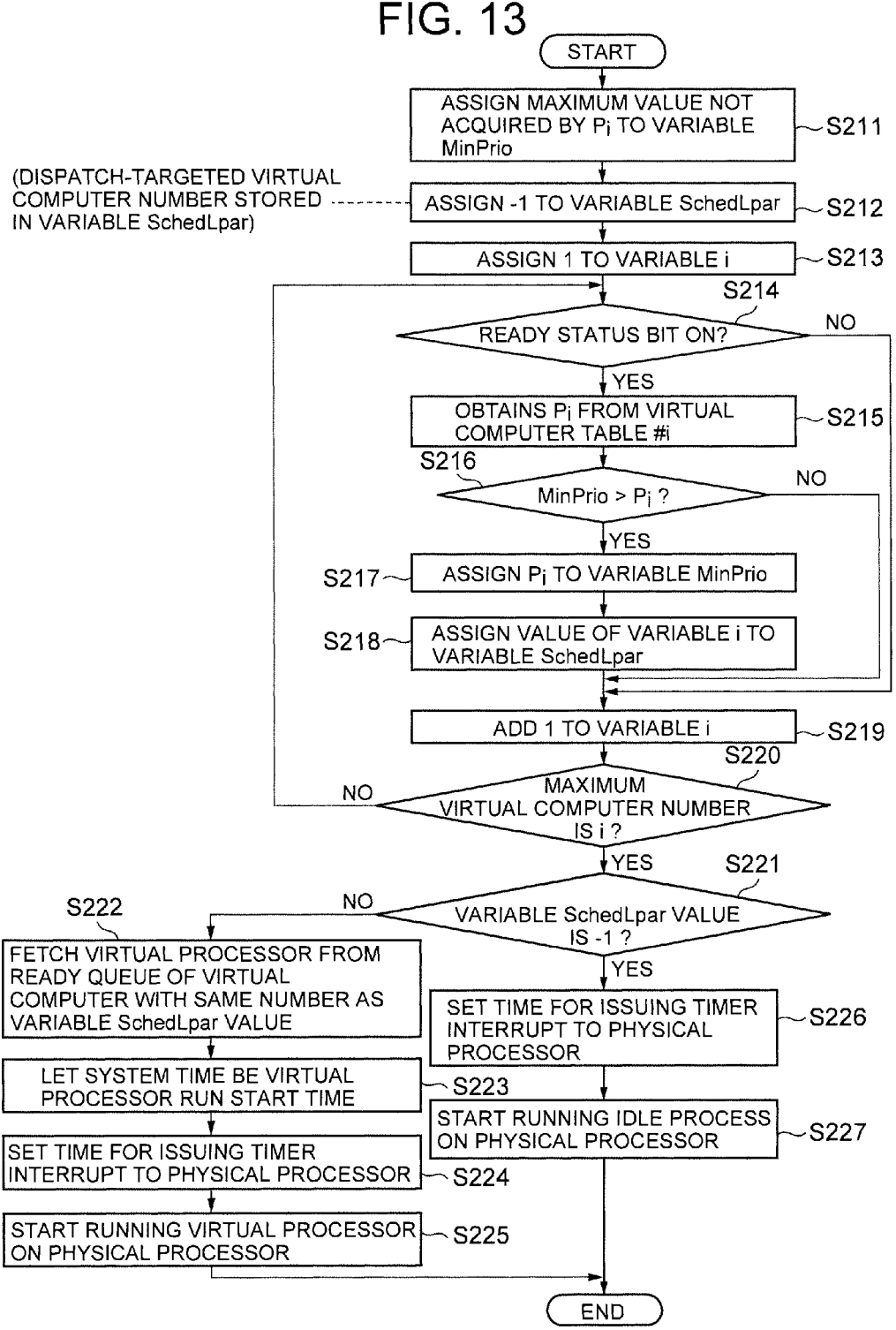
FIG. 13 is a flowchart of processing from a priority comparison to a virtual process run.

FIG. 13 is a flowchart including the steps from the priority comparison to running the virtual processor. This processing is invoked when a schedule-targeted virtual computer 300 is selected with respect to an arbitrary physical processor 002, and, in addition, the virtual processor 303 inside this virtual computer 300 is runned.

In Steps S211 through S213, the initialization of a variables used in the priority comparison is carried out.

That is, in Step S211, the scheduling function 101 assigns a maximum value, which is greater than any value the schedule priority $P_i$ can take, to the variable MinPrio for storing the minimum priority.

In Step S212, the scheduling function 101 assigns −1 to the variable SchedLpar used for storing the schedule-targeted virtual computer number.

In Step S213, the scheduling function 101 assigns 1 to the variable i for storing the virtual computer number during a priority check.

Steps S214 through S219 are repeated for each virtual computer 300.

In Step S214, the scheduler 101 checks the ready status bit 311 in the virtual computer table 310. In a case where the bit 311 is ON (1) (S214: YES), Step S215 is carried out, and in a case where the bit 311 is OFF (0) (Step S214: NO), Step S219 is carried out.

In Step S215, the scheduler 101 obtains the schedule priority $P_i$ from the virtual computer table #i.

In Step S216, the scheduler 101 determines whether or not the value of the variable MinPrio is larger than the priority $P_i$. When the result of the determination is affirmative (S216: YES), Step S217 is carried out, and When the result of the determination is negative (S216: NO), Step S219 is carried out.

In Step S217, the scheduler 101 assigns the value of the schedule priority $P_i$ to the variable MinPrio.

In Step S218, the scheduler 101 assigns the value of the variable i to the variable SchedLpar.

In Step S219, the scheduler 101 adds 1 to the value of the variable i.

In Step S220, the scheduler 101 determines whether or not the value of the variable i is the maximum virtual computer number. That is, a determination is made as to whether or not Step S214 has been carried out for all the virtual computers. When the result of this determination is affirmative, Step S221 is carried out, and when the result of this determination is negative, Step S214 is carried out for a virtual computer whose virtual computer number is the same as the value of the variable i.

In Step S221, the scheduler 101 determines whether or not the value of the variable SchedLpar is −1. In a case where a schedulable virtual computer has not been found up to now, the value of the variable SchedLpar remains −1 (S221: YES), and Step S226 is carried out. When this is not the case (S221: NO), a schedulable virtual computer has been found and Step S222 is carried out.

In Step S222, the scheduler 101 fetches a virtual processor from the head of the ready queue #i of the virtual computer #i with the same number as the value of the variable SchedLpar.

In Step S223, the scheduler 101 identifies the system time and registers information denoting the system time as information 319 that denotes the run start time of the virtual processor in the virtual processor table #i.

In Step S224, the scheduler 101 sets the time for issuing a timer interrupt to physical processor #j. The length of time from the virtual processor run start time until the time that the timer interrupt is to be issued to the physical processor #j corresponds to the time slice duration for the virtual processor. In the virtual processor table #i, if the remaining time of the previous time slice denoted by the information 320 is 0, the timer interrupt will be issued after the time slice duration $t_j$ has elapsed from the virtual processor run start time (the time denoted by the information 319). In a case where a value other than 0 is set as the previous time slice remaining time, the timer interrupt will be issued after the previous time slice remaining time has elapsed from the virtual processor run start time.

In Step S225, the scheduler 101 starts to run the virtual processor on the physical processor #j.

In Step S226, the scheduler 101 sets the time for issuing a timer interrupt to the physical processor #j. The time period from the idle process run start time until the time that the timer interrupt is issued to the physical processor #j is the time slice duration for the idle process #j.

In Step S227, the scheduler 101 starts to run the idle process #j on the physical processor #j.

<<Steps including Suspending of Running Virtual Processor to Update of Number of Used Cycles and Number of Out-of-Service Times (Steps S23 and S24 of FIG. 12)>>

It is supposed that the virtual computer #i is scheduled for a certain time slice x, and that running has ended. After running ends, the value of the number of used cycles $U_i$ is updated. In a case where the number of possessing cycles $Q_i$ remains after scheduling ends, the product of the frequency $f_{ix}$ of the physical processor on which the suspended virtual processor had been running immediately prior and the runtime $r_{ix}$, which is the length of time that this virtual processor continuously ran immediately prior, is added to the number of used cycles $U_i$ up to now. The reason for calculating the runtime $r_{ix}$ and the frequency $f_{ix}$ is to use these to obtain the number of run cycles.

The post-update number of used cycles $U_{new\_i}$ is calculated in accordance with Formula 6 below.

$$U_{new\_i}=U_i+f_{ix}\times r_{ix} \quad \text{[Formula 6]}$$

If a virtual computer enters idle state and the corresponding virtual processors transition to suspend mode, the virtual processor running on the physical processor can yield the physical processor to another virtual processor belonging to a different virtual computer. For this reason, a different alphabetical reference sign $r_{ix}$ is used as the runtime here instead of the value according to the period of timer (the time slice duration) $t_j$. If the virtual processor running on a physical processor does not run uninterrupted for the duration of the time slice, information denoting the remaining time of the time slice is stored as the information 320 (the previous time slice remaining time) in the virtual processor table #i.

In the explanation of this embodiment, the fact that the virtual computer #i including virtual processors uses up the number of possessing cycles $Q_i$ as a result of this virtual processor having been run is called an out-of-service occurrence. The out-of-service occurrence applies to the condition of Formula 7 below.

$$Q_i<U_i+f_{ix}\times r_{ix} \quad \text{[Formula 7]}$$

In a case where the occurrence of out-of-services has been detected in the virtual computer #i, the scheduler 101 adds 1 to the number of out-of-service times $O_i$. In the case of an out-of-service occurrence, the equation employed for updating the number of used cycles changes from Formula 6 to Formula 8 below.

A value obtained by adding the product of the physical processor frequency $f_{ix}$ and the runtime $r_{ix}$ to the number of used cycles $U_i$, and, in addition, subtracting the $Q_i$ becomes the post-update number of used cycles. That is, when an out-of-service occurs, the post-update number of used cycles is obtained as shown in Formula 8 below.

$$U_{new\_i}=U_i+f_{ix}\times r_{ix}-Q \quad \text{[Formula 8]}$$

Figure 14:
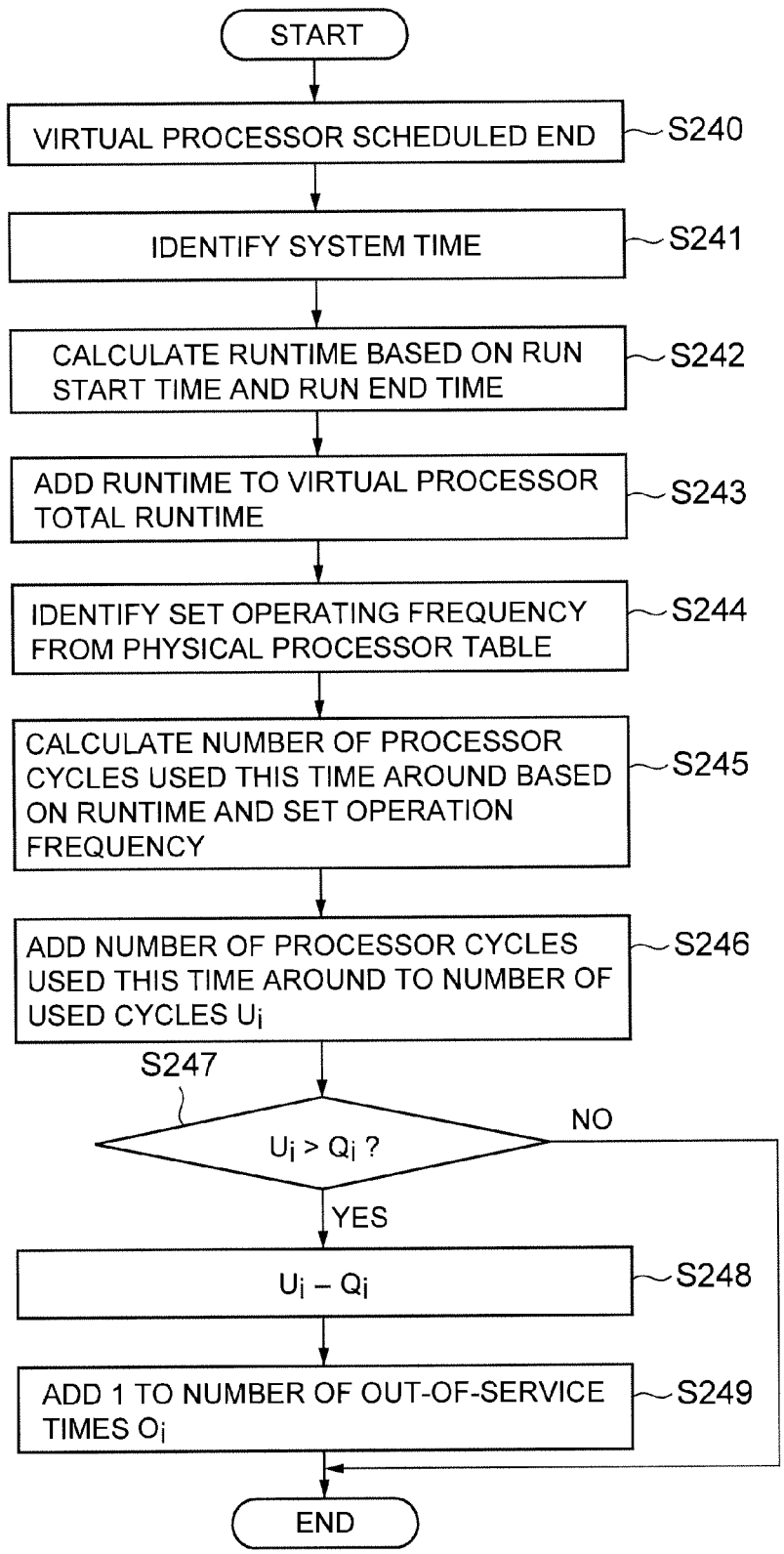
FIG. 14 is a flowchart of processing from a run suspend of a virtual processor of a virtual computer #i to the updating of the number of used cycles and the number of out-of-service times.

FIG. 14 is a flowchart of the steps from suspending the running of the virtual processor belonging to the virtual computer #i to the update of the number of used cycles and the number of out-of-service times.

The trigger that invokes the task of FIG. 14 is either a case where the virtual processor hands over the physical processor, or a case where the virtual processor has run through the duration of the time slice.

In Step S240, the running of the virtual processor is suspended.

In Step S241, the scheduler 101 identifies the system time when the virtual processor stopped running by referencing the system time 007 at virtual processor run end time.

In Step S242, the scheduler 101 subtracts the virtual processor run end time from the virtual processor run start time denoted by the information 319 of the virtual processor table #i. The value calculated in accordance with this is the virtual processor runtime $r_{ix}$.

In Step S243, the scheduler 101 adds the virtual processor runtime $r_{ix}$ to the information 215 (the information denoting the sum of the virtual processor runtime) inside the physical processor table #j corresponding to the physical processor #j on which the suspended virtual processor had run.

In Step S244, the scheduler 101 identifies the set operating frequency $f_j$ ($f_{ix}$) from the physical processor table #j.

In Step S245, the scheduler 101 finds the product of the runtime $r_{ix}$ and the set operating frequency $f_{ix}$. This product is the number of processor cycles during this run time.

In Step S246, the scheduler 101 adds the number of processor cycles used during this run time ($f_{ix} \times r_{ix}$) to the number of used cycles $U_i$ in the virtual computer table #i corresponding to the virtual computer #i of the suspended virtual processor. That is, the above-described Formula 6 is computed.

In Step S247, the scheduler 101 determines whether or not the number of used cycles $U_i$ is larger than the number of hold cycles $Q_i$ based on the virtual computer table #i. This Step is for checking the presence or absence of an out-of-service case. If the value of $U_i$ is equal to or less than the $Q_i$ (S247: NO), the processing ends. When the value of $U_i$ is larger than the $Q_i$ (S247: YES), Step S248 is carried out.

In Step S248, the scheduler 101 subtracts the number of possessing cycles $Q_i$ from the number of used cycles $U_i$ (the post-update $U_i$ of Step S246) in the virtual computer table #i. The post-update $U_i$ of this Step is the $U_{new\_i}$ in accordance with the above-described Formula 8.

In Step S249, the scheduler 101 adds 1 to the number of out-of-service times $O_i$ in the virtual computer table #i.

Subsequent to the processing of FIG. 14, the decisions from Steps S31 through S34 of FIG. 12 are carried out.

<<Determining Whether the Initialization Cycle T has Elapsed or Not (Step S31 of FIG. 12)>>

In order to determine whether the initialization cycle T has elapsed or not, the scheduler 101 checks whether the current system time is after the time initialization cycle T has elapsed from the last initialization time LastS or not, based on the global table 201. When the result of the decision is affirmative (S31 of FIG. 12: YES), the processing of FIG. 12 ends. Thereafter, Step S1 of FIG. 8 (the scheduling initialization process of FIG. 9) is carried out.

<<Determining Presence/Absence of Service Ratio Setting Change (Step S32 of FIG. 12)>>

The scheduler 101 determines whether or not the service ratio $W_i$ of any of the virtual computers has been changed by the user. When the result of this decision is affirmative (S32 of FIG. 12: YES), the processing of FIG. 12 ends. Thereafter, Step S1 of FIG. 8 (the scheduling initialization feature of FIG. 9) is carried out.

<<Determining Presence/Absence of Changes in Number of Virtual Computers (Step S33 of FIG. 12)>>

The scheduler 101 determines whether either an operating virtual computer is suspended or a new virtual computer is started or not. In a case where the result of this decision is affirmative (S33 of FIG. 12: YES), the processing of FIG. 12 ends. Thereafter, Step S1 of FIG. 8 (the scheduling initialization feature of FIG. 9) is carried out.

<<Determining Presence/Absence of Frequency Changes Due to External Factors (Step S34 of FIG. 12) and Processing When Frequency Changes Due to External Factors are Detected (Step S35 of FIG. 12)>>

The frequency change detector 104 determines whether the operating frequency of the physical processor has been changed or not due to a factors other than the frequency changer 105 (for example, the start up of a processor power capping function, or the detection of a temperature abnormality in the physical processor). When the result of this decision is affirmative (S34 of FIG. 12: YES), Step S35 is carried out. Alternatively, when the result of this decision is negative (S34 of FIG. 12: NO), Step S21 of FIG. 12 is carried out once again.

When any of the results of decisions S31, S32 or S33 of FIG. 12 is YES, the processing of FIG. 12 ends, and the initialization feature 103 in S1 of FIG. 8 is called.

In this embodiment, Step S34 of FIG. 12 is added as one of the conditions that causes initialization of scheduler. When S34 is YES, Step S35 is executed. For this reason, the accuracy of the service ratio control (to distribute the instructions proportionally with the service ratios of the virtual computers) is not lost even when the operating frequency has been changed due to some external factor.

Figure 15:
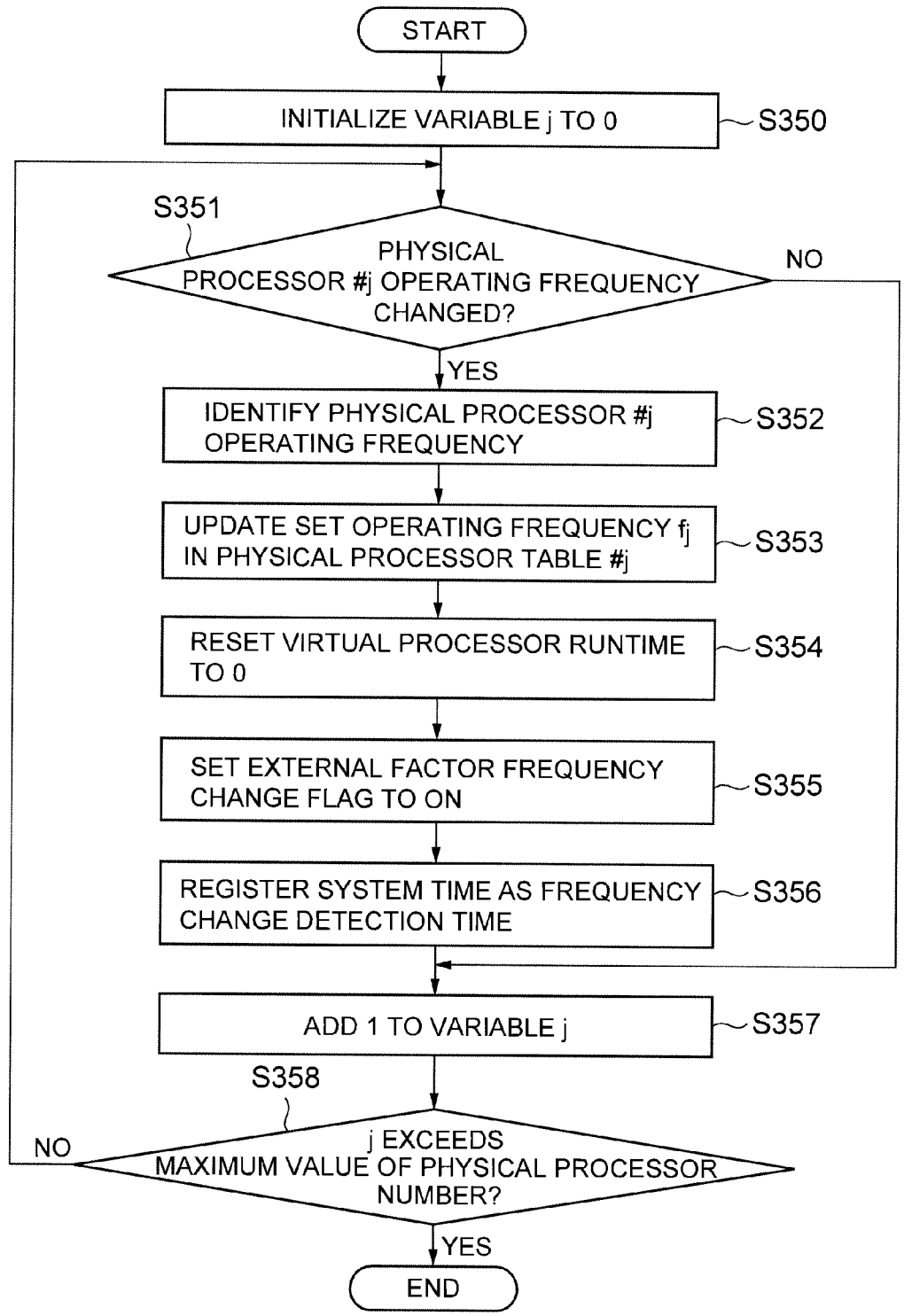
FIG. 15 is a flowchart of processing when determining the presence or absence of a frequency change in accordance with an external factor, and when a frequency change has been detected.

FIG. 15 is a flowchart of a determining the presence/absence of an external factor-based frequency change and the action when a frequency change is detected. FIG. 15 shows Steps S34 and S35 of FIG. 12 in detail. The step shown in FIG. 15 is carried out by the frequency change detector 104, which is a part of the scheduler 101. The frequency change can be detected and the frequency changer 105 carries out operations based on information collected by the load monitoring agent 106 subsequent to the frequency change.

In Step S350, the frequency change detector 104 initializes the variable j, which is the physical processor number, to 0.

In Step S351, the frequency change detector 104 determines whether the operating frequency of the physical processor #j has been changed by an external factor or not. When the result of this decision is affirmative (S351: YES), Step S352 is carried out, and when the result of this decision is negative (S351: NO), Step S357 is carried out.

In Step S352, the frequency change detector 104 identifies the operating frequency $f_j$ from the physical processor #j register 004.

In Step S353, the frequency change detector 104 updates the information 211 of the physical processor table #j to information denoting the operating frequency identified in Step S352.

In Step S354, the frequency change detector 104 resets the virtual processor runtime $r_{ix}$ to 0.

In Step S355, the frequency change detector 104 sets an external factor frequency change flag 216 in the physical processor table #j to ON (1).

In Step S356, the frequency change detector 104 registers information denoting the current system time in the physical processor table #j as the information 217 that denotes the frequency change detection time.

In Step S357, the frequency change detector 104 adds 1 to the variable j.

In Step S358, the frequency change detector 104 determines whether the value of the variable j is larger than the maximum value of the physical processor number or not. When the result of this decision is affirmative (S358: YES), the processing of FIG. 15 ends. When the result of this decision is negative (S358: NO), Step S351 is carried out once again.

The contents presented above is a detailed description of Steps S1 through S3 of FIG. 8.

A specific example of the operation carried out when the number of processor cycles-based scheduling of this embodiment is applied will be explained below. It is supposed here that the proportion of the service ratios of the virtual computers 300 is #1:#2:#3=5:3:2, and that the scheduling initialization cycle $T_1$ is 100 ms.

Furthermore, it is supposed here that because the virtual computer is idle, the virtual processor yields the physical processor in the middle of a time slice. It is also supposed that there is no change in the service ratio during the time from 0 ms to 100 ms. Therefore the operation of the virtual computer will not be suspended in middle of a time slice. Also, a new virtual computer is not started up, and there is no external factor-based operating frequency change. Furthermore, a "yield" means that the run of virtual processors stop and the physical processor is thereby released.

According to the above-described Formula 3, the number of hold cycles $Q_1$ of the virtual computer #1 is $(100 \times 10^{-3}) \times (3.2 \times 10^9 + 1.6 \times 10^9) \times (5/(5+3+2)) = 240 \times 10^6$, that is, 240 megacycles.

According to the above-described Formula 3, the number of hold cycles $Q_2$ of the virtual computer #2 is $(100 \times 10^{-3}) \times (3.2 \times 10^9 + 1.6 \times 10^9) \times (3/(5+3+2)) = 144 \times 10^6$, that is, 144 megacycles.

According to the above-described Formula 3, the number of hold cycles $Q_3$ of the virtual computer #3 is $(100 \times 10^{-3}) \times (3.2 \times 10^9 + 1.6 \times 10^9) \times (2/(5+3+2)) = 96 \times 10^6$, that is, 96 megacycles. Due to the large number of digits for the number of cycles, values will be expressed in the drawings and text in units of mega ($10^6$) cycles.

The time slice S is set at $1.6 \times 10^7$ cycles.

Since the operating frequency of the physical processor #0 is 3.2 GHz, the interval at which timer interrupts are issued becomes $(1.6 \times 10^7)/(3.2 \times 10^9) = 5.0 \times 10^{-3}$ according to the above-described Formula 4. This means that the virtual processor that is scheduled to this physical processor #0 can only run continuously for 5 ms.

Since the operating frequency of the physical processor #1 is 1.6 GHz, the interval of timer interrupts issued becomes $(1.6 \times 10^7)/(1.6 \times 10^9) = 1.0 \times 10^{-2}$ according to the above-described Formula 4. This means that the virtual processor scheduled to the physical processor #1 can only run continuously for 10 ms.

The operation of the number of processor cycles-based scheduler at the respective point of time will be explained hereinbelow. Furthermore, FIG. 16 shows the schedule priority of each virtual computer at respective point of time. The schedule priority $P_i$ of the virtual computer #i is the ratio of the number of used cycles $U_i$ to the number of possessing cycles $Q_i$. That is, in the explanation of FIG. 16 and later, the number of used cycles $U_i$ in the numerator and the number of possessing cycles $Q_i$ in the denominator will be clearly expressed in units of number of megacycles with respect to the schedule priority $P_i$. FIG. 17 is a table showing the physical processor on which the virtual processor of the virtual computer ran during respective time periods ("CPU 0" is the physical processor #0, and "CPU 1" is the physical processor #1). According to FIG. 17, in a case where the priorities of multiple virtual computers are equivalent, the virtual computer having the smallest number is chosen as the time slice allocation destination. Furthermore, the physical processor having the smallest number is selected as the time slice allocation source. However, this is only one example. For instance, the virtual computer or the physical processor having the largest number can be selected as well.

At the time 0 ms, a virtual processor of a virtual computer that is running exists neither on the physical processor #0 nor the physical processor #1. In this embodiment, since the operating frequency and therefore the processing speed of the physical processor #0 is higher than the operating frequency of the physical processor #1, a run-target virtual computer is preferentially allocated to the physical processor #0. Since the priorities of all the virtual computers are equivalent, i.e. 0, the virtual processor of the virtual computer #1, which has the smallest virtual computer number, is scheduled to the physical processor #0. Then, the virtual computer #2, which has the next smallest virtual computer number, is selected as the allocated virtual computer for the physical processor #1.

At the time 5 ms, a timer interrupt is issued to the physical processor #0, and the virtual processor of the virtual computer #1 yields the physical processor #0. For this reason, an comparison between the priorities of the virtual computers is carried out. The virtual processor of the virtual computer #2 is still running on the physical processor #1. Since each virtual computer has only one virtual processor in this embodiment, the ready status bit #2 of the virtual computer #2 is OFF (0), and the virtual computer #2 is not included as a target for the priority comparison. Since the priority comparison reveals that the priority of the virtual computer #3 takes the lowest value, i.e. 0. Therefore, the virtual processor of the virtual computer #3 is scheduled to the physical processor #0.

At the time 10 ms, timer interrupts are issued to both of the physical processors, #0 and #1. Thus, the virtual processors of the virtual computer #3 and the virtual computer #2 each yield their physical processors. A priority comparison of the virtual computers is carried out in the order of the physical processor #0 and the physical processor #1. Since the priorities of the virtual computers for the physical processor #0 are 16/240: 16/144:16/96, the virtual computer #1, which is the smallest, is selected. The virtual computer #2, which has the next smallest value, is selected as the running virtual computer for the physical processor #1.

At the 15 ms, a timer interrupt is issued to the physical processor #0, the virtual processor of the virtual computer #1 yields the physical processor #0, and a priority comparison between the virtual computers is carried out. Since the virtual processor of the virtual computer #2 is still running on the physical processor #1 and the ready status bit #2 is OFF (0), the virtual computer #2 is not included in the priority comparison. Comparing the priorities 32/240:16/96 of the remaining virtual computers #1 and #3, the first has a smaller value. Therefore, the virtual processor of the virtual computer #1 is scheduled to the physical processor #0.

At time 20 ms, since timer interrupts are issued to both of the physical processors #0 and #1, the virtual processors of the virtual computers #1 and #2 yield their physical processors. A virtual computer priority comparison is carried out in the order of the physical processor #0 and the physical processor #1. Since the priorities of the virtual computers for the physical processor #0 are 48/240:32/144:16/96, the virtual computer #3, with the smallest value, is selected. The virtual computer #1, which is the second smallest value, is selected as the virtual computer to run on the physical processor #1.

At time 25 ms, a timer interrupt is issued to the physical processor #0 causing the virtual processor of the virtual computer #3 to yield the physical processor #0. Then, a priority comparison of virtual computers is carried out. Since the virtual processor of the virtual computer #1 is still running on the physical processor #1 and the ready status bit #1 is OFF (0), the virtual computer #1 is not included in the priority comparison. Comparing the priorities 32/144:32/96 of the remaining virtual computers #2 and #3, the first has a smaller value. Therefore the virtual processor of the virtual computer #2 is scheduled to the physical processor #0.

At time 30 ms, timer interrupts are issued to both physical processors #0 and #1. The virtual processors of the virtual computers #2 and #1 yield their physical processors. A priority comparison of the virtual computers is carried out in the order of the physical processor #0 and the physical processor #1. Since the priorities of the virtual computers for the physical processor #0 are 64/240:48/144:32/96, the virtual computer #1, with the smallest value, is selected. Looking at the virtual computers for the physical processor #1, the priorities for both the virtual computer #2 and the virtual computer #3 take equal values which is ⅓. In this case, the virtual processor of the virtual computer #2, which has the smallest virtual computer number, is scheduled.

At time 35 ms, a timer interrupt is issued to the physical processor #0 and the virtual processor of the virtual computer #1 surrenders the physical processor #0. A comparison of virtual computer priorities is carried out. Since the virtual processor of the virtual computer #2 is still running on physical processor #1 and the ready status bit #2 is OFF (0), the virtual computer #2 is not included in the priority comparison. Comparing the priorities of the remaining virtual computers #1 and #3, 80/240:32/96 are both equal to ⅓. In such a case, the virtual processor of the virtual computer #1, which has the smallest virtual computer number, is scheduled to the physical processor #0.

At time 40 ms, since timer interrupts are issued to both physical processors #0 and #1, the virtual processors of the virtual computers #1 and #2 yield their physical processors. A comparison of the virtual computer priorities is carried out in the order of the physical processor #0 and the physical processor #1. Since the priorities of the virtual computers for the physical processor #0 are 96/240:64/144:32/96, the virtual computer #3, taking the smallest value is selected. Looking at the virtual computers for the physical processor #1, the value for the virtual computer #1 is the second smallest. Consequently, the virtual processor of the virtual computer #1 is scheduled to the physical processor #1.

At time 45 ms, a timer interrupt is issued to the physical processor #0, causing the virtual processor of the virtual computer #3 yielding the physical processor. Then, a comparison of virtual computer priorities is carried out. Since the virtual processor of the virtual computer #1 is still running on the physical processor #1 and the ready status bit #1 is OFF (0), the virtual computer #1 is not included in the priority comparison. Comparing the priorities 64/144:48/96 of the remaining virtual computers #2 and #3, the first has a smaller value. Therefore the virtual processor of the virtual computer #2 is scheduled to the physical processor #0.

At time 50 ms, since timer interrupts are issued to both physical processors #0 and #1, the virtual processors of the virtual computers #2 and #1 yield their physical processors. A comparison of the virtual computer priorities is carried out in the order of the physical processor #0 and the physical processor #1. Since the priorities of the virtual computers for the physical processor #0 are 112/240:80/144:48/96, the virtual computer #1, which has the smallest value, is selected. Looking at virtual computers for the physical processor #1, the value of the priority of the virtual computer #3 is the next smallest, so the virtual processor of the virtual computer #3 is scheduled for the physical processor #1.

At time 55 ms, a timer interrupt is issued to the physical processor #0, the virtual processor of the virtual computer #1 yields the physical processor #0. Then, a comparison of virtual computer priority is carried out. Since the virtual processor of the virtual computer #3 is still running on the physical processor #1 and the ready status bit #3 is OFF (0), the virtual computer #3 is not included in the priority comparison. Comparing the priorities 128/240:80/144 of the remaining virtual computers #1 and #2, the first has a smaller value, so the virtual processor of the virtual computer #1 is scheduled to the physical processor #0.

At time 60 ms, since timer interrupts are issued to both physical processors #0 and #1, the virtual processors of the virtual computers #1 and #3 yield their physical processors. A comparison of virtual computer priorities is carried out in the order of the physical processor #0 and the physical processor #1. Since the priorities of the run-target virtual computers for the physical processor #0 are 144/240:80/144:64/96, the virtual computer #2, which is the smallest, is selected. Looking at the run-target virtual computers for the physical processor #1, the value of the priority of the virtual computer #1 is the second smallest, so the virtual processor of the virtual computer #1 is scheduled for the physical processor #1.

At time 65 ms, a timer interrupt is issued to the physical processor #0, the virtual processor of the virtual computer #2 yields the physical processor #0. Then a comparison of virtual computer priorities is carried out. Since the virtual processor of the virtual computer #1 is still running on the physical processor #1 and the ready status bit #1 is OFF (0), the virtual computer #1 is not included in the priority comparison. Comparing the priorities of the remaining virtual computers #2 and #3, 96/144:64/96 both values are equivalent to ⅔. The virtual processor of the virtual computer #2, which has the smallest virtual computer number, is scheduled for the physical processor #0.

At time 70 ms, since timer interrupts are issued to both physical processors #0 and #1, the virtual processors of the virtual computers #2 and #1 yield their physical processors. A priority comparison of virtual computers is carried out in the order of the physical processor #0 and the physical processor #1. The priorities of the virtual computers for the physical processor #0 are 160/240:112/144:64/96. Searching for the smallest value, the priorities of both the virtual computer #1 and the virtual computer #3 are values equivalent to ⅔. In this case, the virtual processor of the virtual computer #1, which has the smallest virtual computer number, is scheduled to the physical processor #0. The virtual processor of the other virtual computer #3 is scheduled to the physical processor #1.

At time 75 ms, a timer interrupt is issued to the physical processor #0, the virtual processor of the virtual computer #1 surrenders the physical processor #0. Then, a comparison of virtual computer priorities is carried out. Since the virtual processor of the virtual computer #3 is still running on the physical processor #1 and the ready status bit #3 is OFF (0), the virtual computer #3 is not included in the priority comparison. Comparing the priorities 176/240:112/144 of the remaining virtual computers #1 and #2, the first has a smaller value. Therefore, the virtual processor of the virtual computer #1 is scheduled to the physical processor #0.

At time 80 ms, since timer interrupts are issued to both physical processors #0 and #1, the virtual processors of the virtual computers #1 and #3 yield their physical processors. A priority comparison of virtual computers is carried out in the order of the physical processor #0 and the physical processor #1. Since the priorities of the virtual computers for the physical processor #0 are 192/240:112/144:80/96, the virtual computer #2, which is the smallest, is selected. Looking at the virtual computer for the physical processor #1, the value of the priority of the virtual computer #1 is smaller, so the virtual processor of the virtual computer #1 is scheduled to the physical processor #1.

At time 85 ms, a timer interrupt is issued to the physical processor #0, the virtual processor of the virtual computer #2 yields the physical processor #0, and a priority comparison of virtual computers is carried out. Since the virtual computer #1 is still running on the physical processor #1 and the ready status bit #1 is OFF (0), the virtual computer #1 is not included in the priority comparison. Comparing the priorities 128/144:80/96 of the remaining virtual computers #2 and #3, the second has a smaller value, so the virtual processor of the virtual computer #3 is scheduled to the physical processor #0.

At time 90 ms, since timer interrupts are issued to both physical processors #0 and #1, the virtual processors of the virtual computers #3 and #1 yield their physical processors. A priority comparison of virtual computers is carried out in the order of the physical processor #0 and the physical processor #1. Since the priorities of the virtual computers for the physical processor #0 are 208/240:128/144:96/96, the virtual computer #1, which is the smallest, is selected. The number of used cycles is equivalent to the number of hold cycles for the virtual computer #3. This means that an out-of-service occurred. Looking at the run-target virtual computers for the physical processor #1, the value of the priority of the virtual computer #2 is smaller, so the virtual processor of the virtual computer #2 is scheduled to the physical processor #1.

At time 95 ms, a timer interrupt is issued to the physical processor #0, the virtual processor of the virtual computer #1 yields the physical processor #0. Then a priority comparison of virtual computers is carried out. Since the virtual computer #2 is still running on the physical processor #1 and the ready status bit #2 is OFF (0), the virtual computer #2 is not included in the priority comparison. Comparing the priorities 224/240:1 of the remaining virtual computers #1 and #3, since the second has a smaller value, the virtual processor of the virtual computer #1 is scheduled to the physical processor #0.

At time 100 ms, the number of used cycles of the virtual computer #1 is 240 megacycles, the number of used cycles of the virtual computer #2 is 144 megacycles, and the number of used cycles of the virtual computer #3 is 96 megacycles, and it is clear that the processor cycle has been accurately distributed at the ratio of 5:3:2, which is equivalent to the previously configured service ratios. In this specific example, the scheduling parameter re-computation cycle (the initialization cycle) $T_1$ is set at 100 ms, and therefore the number of hold cycles $Q_i$, the number of used cycles $U_i$, and the number of out-of-service times $O_i$ are all reset to 0 at this point of time.

In the processor cycles-based scheduling example explained hereinabove, there were no cases when idle process is scheduled. Idle processes are scheduled when a virtual computer virtual processor that can run on a physical processor is not found during priority comparison.

A scheduling method that brings not only the ratio of processor cycles allocated to each virtual computer into close proximity with the proportion of the service ratios but also the ratio of the number of executable instructions of each virtual computer to the 5:3:2 service ratios at each point of time is desirable. In cases where scheduling based on this idea is used, it is possible to distribute the execution resources in proportion to the virtual computer service ratios compared with conventional scheduling even when the operating frequencies of the physical processors are different.

Up to here, detailed explanations of FIG. 8 that include the scheduling initialization, the scheduling process, the initialization condition determination process and the tasks done when there are no running virtual computers was presented. However, some of the processes have not yet been explained.

The load monitoring process of Step S2 of FIG. 8, and an individual frequency change process corresponding to Step S5, Step S6, and Step S7 of FIG. 8 will be explained hereinbelow. As shown in the flowchart of FIG. 8, the scheduling is carried out so that it will not conflict with the individual frequency changing process. Frequency changing process moves when the reset of scheduling is proceeding, limiting the negative effects to the throughput.

<Load Monitoring Process (Step S2 of FIG. 8) and Adjustment Condition Determination Process (Step S5 of FIG. 8)>

The cycle $T_2$ of the frequency adjustment process is set to either a value that is equivalent to the cycle $T_1$ of the scheduling initialization, or an integral multiple $\beta T_1$ that is equal to or greater than two times the scheduling initialization cycle $T_1$ (where $\beta$ is an integer of 2 or larger).

As described earlier, in Step S5 of FIG. 8, the time utilization ratio calculation process (Step S6 of FIG. 8) is executed (S5: YES) when referring to the system time, the time $T_2$ has elapsed since the last adjustment time LastF. (the frequency adjustment process cycle) When the cycle $T_2$ is equivalent to the cycle $T_1$, the frequency adjustment process is always carried out prior to the regular scheduling initialization process at this time.

When the cycle $T_2$ is an integral multiple $\beta T_1$ that is equal to or greater than two times the cycle $T_1$, the frequency adjustment process is executed in some cases when there is a scheduling initialization $\beta$.

It is supposed that the workload 600 of the physical processor #0 has changed as shown in the graph at the top of FIG. 2 during operation. The throughput 603 of the physical processor #0 will change as shown in the graph at the bottom of FIG. 2 in accordance with the changes of workload 600, and the operations of the frequency changer 105 and the load monitoring agent 106. The amount of usable execution resources 601 at each point of time is the upper limit of the number of cycles capable of being processed per second, which is determined by the operating frequency at the point of time.

Furthermore, it is supposed that a frequency change caused by some external factor has not occurred during the time ranges shown in the top and bottom graphs of FIG. 2. It is supposed that the set operating frequency of the physical processor #0 is a maximum value of 3.2 GHz, and that this setting is able to be changed in units of 133 MHz down to a minimum value of 1.6 GHz.

According to the graph at the top of FIG. 2, the workload 600 of the physical processor #0 changes as described below.

That is, from time 0 to time t1, the workload 600 is $6.4 \times 10^8$ cycles/second.

At time t1, the workload 600 rises from $6.4 \times 10^8$ cycles/second to $2.56 \times 10^9$ cycles/second.

At time t2, the workload 600 drops from $2.56 \times 10^9$ cycles/second to $9.6 \times 10^8$ cycles/second.

According to the graph at the bottom of FIG. 2, the throughput 603 of the physical processor #0 changes as follows.

From time 0 to time t1, the throughput 603 becomes $6.4 \times 10^8$ cycles/second, and is equivalent to the workload 600. Since the set operating frequency is 1.6 GHz, the amount of usable execution resources 601 is $1.6 \times 10^9$ cycles/second.

At time t1, as a result of the workload 600 rise, the throughput 603 rises to $1.6 \times 10^9$ cycles/second, which is the amount of usable execution resources 601.

From time t1 to time $t1+T_2$, the amount of usable execution resources 601 is $1.6 \times 10^9$ cycles/second with respect to the $2.56 \times 10^9$ cycles/second of the workload 600, thereby resulting in shortage of usable execution resources and a throughput 603 smaller than the workload 600.

At time $(t1+T_2)$, the set operating frequency of the physical processor #0 is raised to 3.2 GHz by the operations of the load monitoring agent 106 and the frequency changer 105, and the amount of usable execution resources 601 rises to $3.2 \times 10^9$ cycles/second. The throughput 603 of the physical processor #0 rises to $2.56 \times 10^9$ cycles/second, which is equivalent to the workload 600.

At time t2, the workload 600 drops, but the throughput 603 remains at $2.56 \times 10^9$ cycles as-is until time (t2+X) (X>0). This is because, during the period from time t1 to $(t1+T_2)$, a portion of the work generated prior to time t2 is processed at time t2 and later to compensate for the execution resource shortage.

At time (t2+X), the processing of the work generated prior to time t2 ends, and the throughput 603 consequently drops to $9.6 \times 10^8$ cycles/second, which is equivalent to the workload 600. The set operating frequency of the physical processor #0 stays at 3.2 GHz as-is.

At time $(t2+X+T_2)$, the set operating frequency of the physical processor #0 is lowered to 2.0 GHz in accordance with the operations of the load monitoring agent 106 and the frequency changer 105, and the amount of usable execution resources 601 drops to $2.0 \times 10^9$ cycles/second.

As explained hereinabove, the throughput 603 of the physical processor #0 is determined by the set operating frequency of the physical processor #0.

When the amount of usable execution resources 601 of the physical processor #0 is sufficient, the workload 600 on the physical processor #0 as-is equivalent to the throughput 603. In a case where the workload 600 on the physical processor #0 exceeds the amount of usable execution resources 601, the throughput 603 can only take a value up to that of the amount of usable execution resources 601 at the time.

Figure 18:
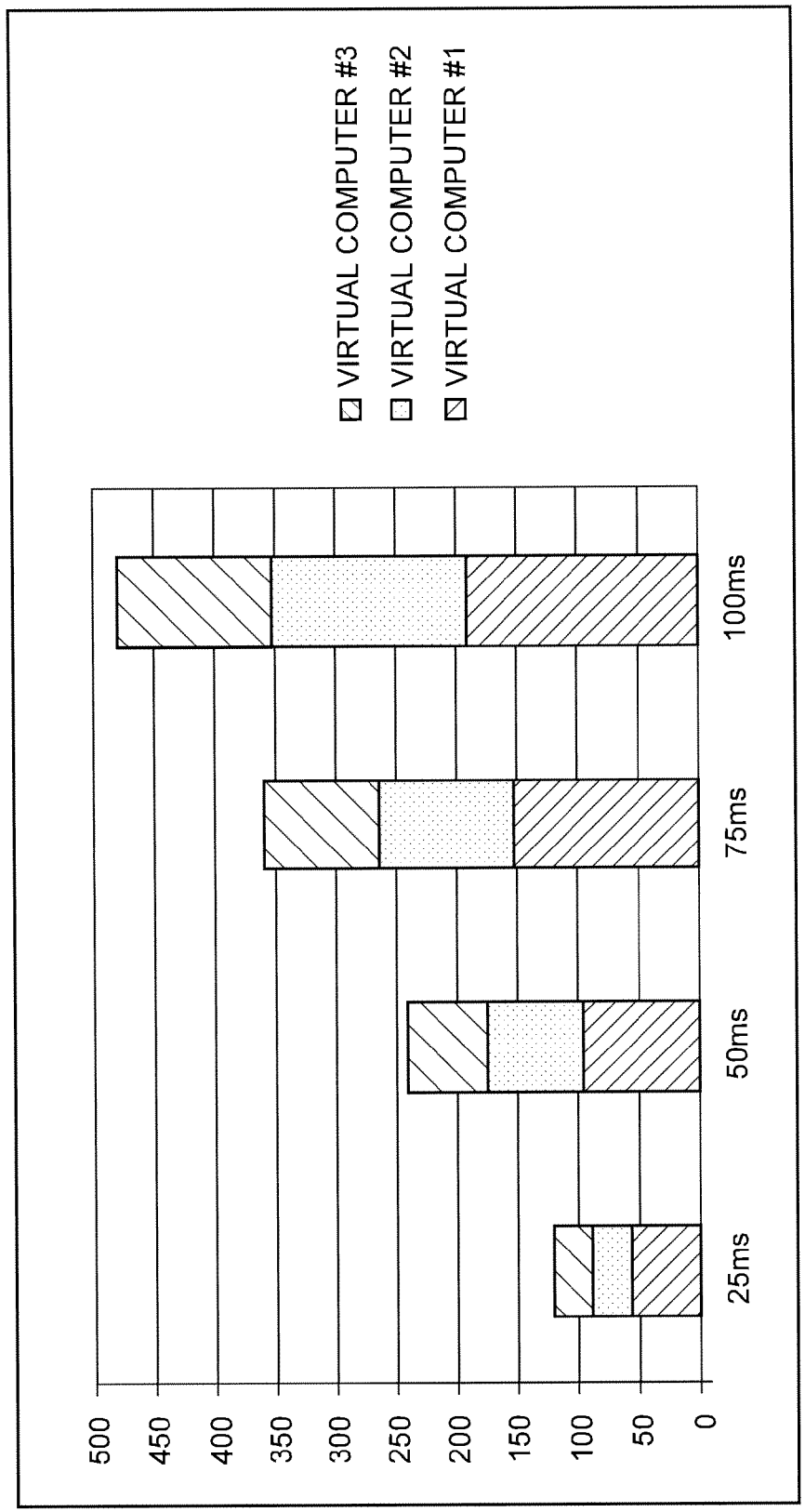
FIG. 18 is a graph showing the distribution of the number of processor cycles to each virtual computer by time.

In the example of processor cycles-based scheduling shown from FIG. 16 through FIG. 18, the virtual computers are not idle, therefore the virtual processors do not yield the physical processor prior to using up the time slice. Also there are no cases where there were no schedulable virtual computers during priority comparison. Therefore, there was some virtual processor running on the physical processor. There are no cases when an idle process is scheduled on the physical processor. In the example shown FIG. 16 through FIG. 18, during the entire period from time 0 ms through time 100 ms, both physical processors #0 and #1 are running some virtual processor of some virtual computer, and the respective virtual processors are using all of the assigned processor time. Therefore, it is clear that the time utilization factor of each of the physical processors 002 is 1.0.

In a case where any virtual computer is idle and the virtual processor is in the suspend mode, there is no virtual computer virtual processor to run on the physical processor, and the idle process is scheduled on the physical processor. When a larger number of virtual computers becomes idle for a longer period of time, the workload of the entire computer system decreases, and the total time for the idle process running on physical processors becomes longer. In such a case, the time utilization factor of the respective physical processors are expected to drop.

The time utilization ratio $\alpha_j$ of the physical processor #j is the ratio of the total runtime of the virtual processors on the physical processor #j (the value denoted by the information 215 of the physical processor table #j) to a certain time period (for example, a computation target time, which will be explained hereinbelow). In a case where the physical processor #j has processed work that was assigned during a certain period, the time utilization ratio $\alpha_j$ becomes the input for determining "How much of the usable execution resources determined by the set operating frequency on the physical processor #j is being utilized during this period?".

<Physical Processor Time Utilization Ratio Calculation Process (Step S6 of FIG. 8)>

Figure 19:
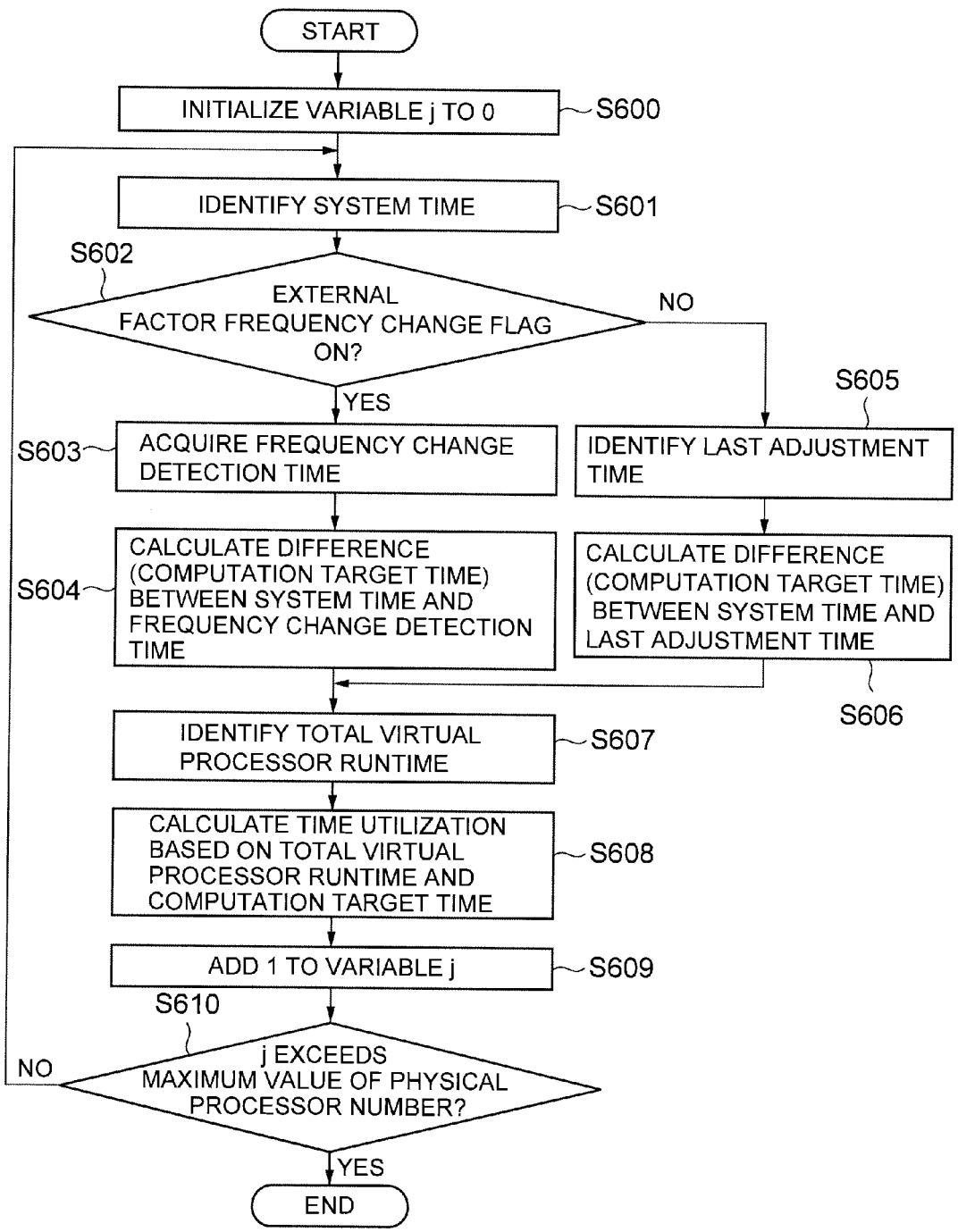
FIG. 19 is a flowchart of a time utilization factor calculation process.

FIG. 19 is a flowchart of a time utilization ratio calculation process.

In Step S600, the load monitoring agent 106 initializes the variable j, which is the physical processor number, to 0.

In Step S601, the load monitoring agent 106 identifies the system time.

In Step S602, the load monitoring agent 106 determines whether or not the external factor frequency change flag 216 of the physical processor #j is ON (1). When the flag 216 is ON (1) (S602: YES), Step S603 is carried out, and when the flag 216 is OFF (0) (S602: NO), Step S605 is carried out.

In Step S603, the load monitoring agent 106 determines the frequency change detection time denoted by the information 217 in the physical processor table #j.

In Step S604, the load monitoring agent 106 calculates the difference between the system time determined in Step S601 and the frequency change detection time determined in Step S603. The difference between the two values is regarded as the computation target time in Step S608.

In Step S605, the load monitoring agent 106 identifies the last adjustment time LastF from the global table 201.

In Step S606, the load monitoring agent 106 calculates the difference between the system time determined in Step S601 and the last adjustment time LastF determined in Step S605. This difference is regarded as the computation target time in Step S608.

In Step S607, the load monitoring agent 106 identifies the total virtual processor runtime denoted by the information 215 in the physical processor table #j.

In Step S608, the load monitoring agent 106 calculates the ratio of the total virtual processor runtime determined in Step S607 with respect to the computation target time calculated in either Step S604 or S606. This ratio is the time utilization ratio $\alpha_j$ of the physical processor #j.

In Step S609, the load monitoring agent 106 adds 1 to the variable j.

In Step S610, the load monitoring agent 106 determines whether or not the value of the post-updated variable j is larger than the maximum value of the physical processor number. When the result of this determination is affirmative (S610: YES), the processing of FIG. 18 ends. Alternatively, when the result of this determination is negative (S610: NO), Step S601 is carried out once again.

The evaluation of the time utilization ratio $\alpha_j$ for each cycle $T_2$ in accordance with the load monitoring agent 106 is equivalent to determining the ratio of area that the throughput 603 occupies to the area for amount of usable execution resources 601. The "area" referred here corresponds to the area between the time axis and the top border lines for the quantities 601 and 603, for the space from time $nT_2$ to time $(n+1) T_2$ in the graph at the bottom of FIG. 2 when n is treated as an integer equal to or larger than 0.

<Physical Processor Frequency Adjustment Process (Step S7 of FIG. 8)>

The frequency changer 105, based on the time utilization ratio $\alpha_j$ for each cycle $T_2$ (the ratio of the area that throughput 603 occupies to the area that the amount of usable execution resources 601 occupies in the time interval from $nT_2$ to $(n+1) T_2$), determines the next set operating frequency for the time interval $(n+1) T_2$ from $(n+2) T_2$. The frequency changer 105 updates the operating frequency of the physical processor #j to the new operating frequency.

The first threshold $Y_1$ and second threshold $Y_2$ are used as criteria when the frequency changer 105 determines the new set operating frequency (there may be one, two or more thresholds).

When the time utilization ratio $\alpha_j$ is larger than the first threshold $Y_1$ for the time interval $nT_2$ to $(n+1) T_2$, the frequency change function 105 will set the operating frequency for the next time interval $(n+1) T_2$ to $(n+2) T_2$ at a higher value.

When the time utilization ratio $\alpha_j$ is smaller than the second threshold $Y_2$ in the time interval $nT_2$ to $(n+1) T_2$, the frequency changer 105 lowers the set operating frequency for the next time interval $(n+1) T_2$ to $(n+2) T_2$.

Figure 20:
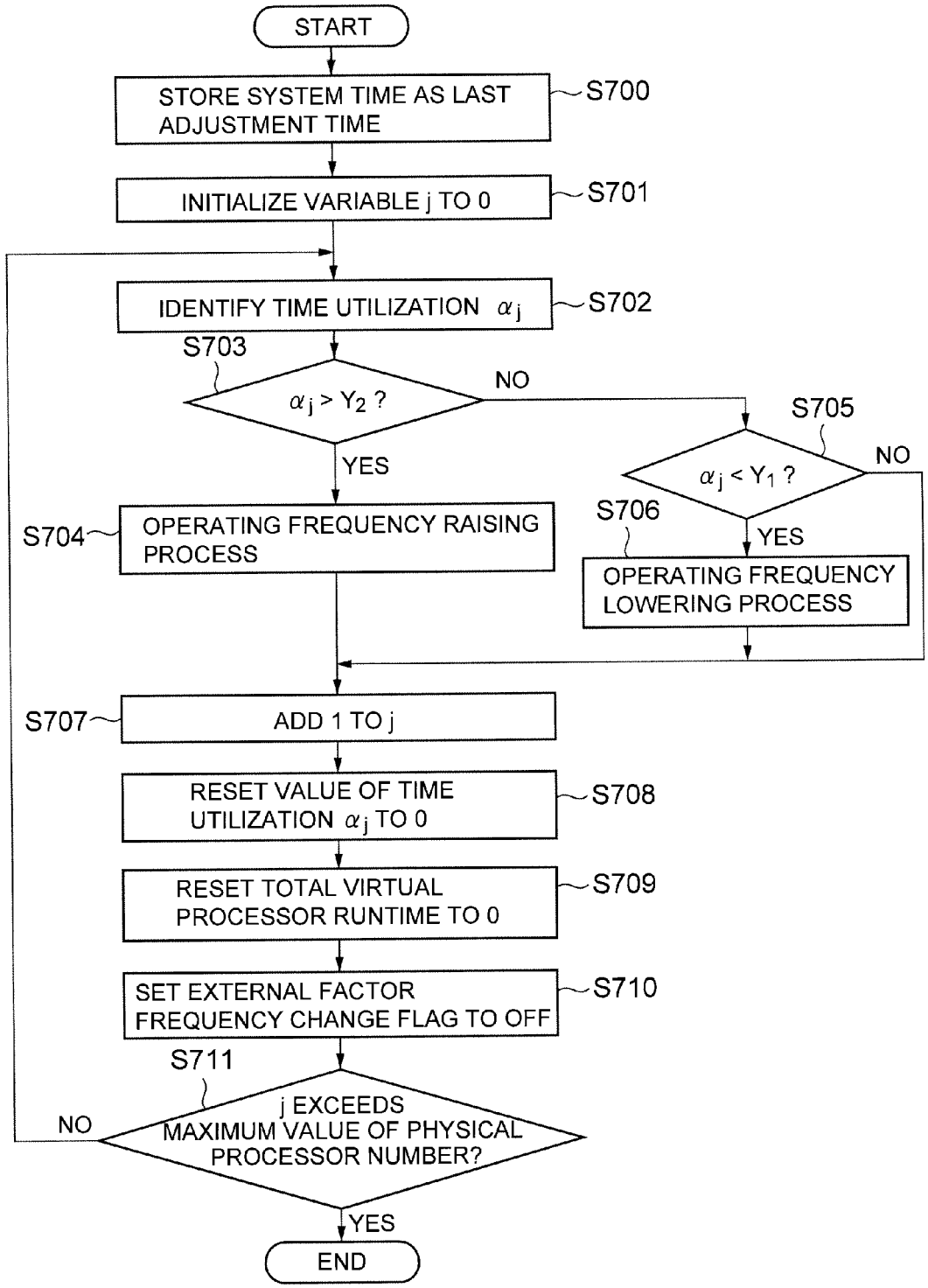
FIG. 20 is a flowchart of a frequency adjustment process.

FIG. 20 is a flowchart for the frequency adjustment process.

In Step S700, the frequency changer 105 identifies the system time and sets the identified system time in the global table 201 as the last adjustment time LastF.

In Step S701, the frequency changer 105 uses 0 to initialize the variable j, which is the physical processor number.

In Step S702, the frequency changer 105 identifies the time utilization ratio $\alpha_j$ from the physical processor table #j.

In Step S703, the frequency changer 105 determines whether the time utilization factor $\alpha_j$ determined in Step S702 is larger than the second threshold $Y_2$ or not. When the result of this determination is affirmative (S703: YES), Step S704 is carried out, and when the result of this determination is negative (S703: NO), Step S705 is carried out.

In Step S704, the frequency changer 105 raises the operating frequency of the physical processor #j (the operating frequency for the next cycle $T_2$). Specifically, for example, the frequency changer 105 sets information denoting a higher operating frequency than the current operating frequency of the physical processor #j in the register #j of this physical processor #j.

In Step S705, the frequency changer 105 determines whether the time utilization factor $\alpha_j$ determined in Step S702 is smaller than the first threshold $Y_1$ or not. When the result of this determination is affirmative (S705: YES), Step S706 is carried out, and when the result of this determination is negative (S705: NO), Step S707 is carried out.

In Step S706, the frequency changer 105 lowers the operating frequency of the physical processor #j (the operating frequency for the next cycle $T_2$). Specifically, for example, the frequency changer 105 sets information denoting a lower operating frequency than the current operating frequency of the physical processor #j in the register #j of this physical processor #j.

In Step S707, the frequency changer 105 adds 1 to the physical processor number variable j.

In Step S708, the frequency changer 105 sets the value of the time utilization ratio $\alpha_j$ collected in accordance with the load monitoring agent 106 to 0.

In Step S709, the frequency changer 105 sets the information 215 in the physical processor table #j (the total runtime of the virtual processor) to 0.

In Step S710, the frequency changer 105 sets the external factor frequency change flag 216 in the physical processor table #j to OFF (0).

In Step S711, the frequency changer 105 determines whether the value of the post-update variable j exceeds the maximum value of the physical processor number or not. When the result of this determination is affirmative (S711: YES), the processing of FIG. 20 ends. Alternatively, when the result of this determination is negative (S711: NO), Step S702 is carried out once again.

In the example shown in FIG. 2, when the frequency is raised, the operating frequency is raised to the highest operating frequency of the physical processor.

Furthermore, when the frequency is lowered, in cases when it is assumed that the workload on the physical processor during the period from time $(n+1) T_2$ to time $(n+2) T_2$ will be equivalent to that in the previous period from time $nT_2$ to time $(n+1) T_2$, an adjustment is carried out such that the physical processor time utilization factor is in the proximity of 0.5.

In the example of FIG. 2, although the operation is as described hereinabove, the following algorithm and rule for determining the setting frequency when raising the frequency and lowering the frequency is not limited in any way.

The threshold can be set in desired values as long as the values comply to the restrictions described below. In the example shown in FIG. 2 and referring to FIG. 21 and FIG. 22, the first threshold $Y_1$ is set at 0.4 and the second threshold $Y_2$ is set at 0.9. As long as $Y_1 < Y_2$, the threshold is not otherwise limited.

The operation of the load monitoring agent 106 and the frequency changer 105 until there is some operating frequency change for the physical processor #0 will be explained below by using the physical processor #0 as an example and referring to FIG. 21 and FIG. 22.

Figure 21:
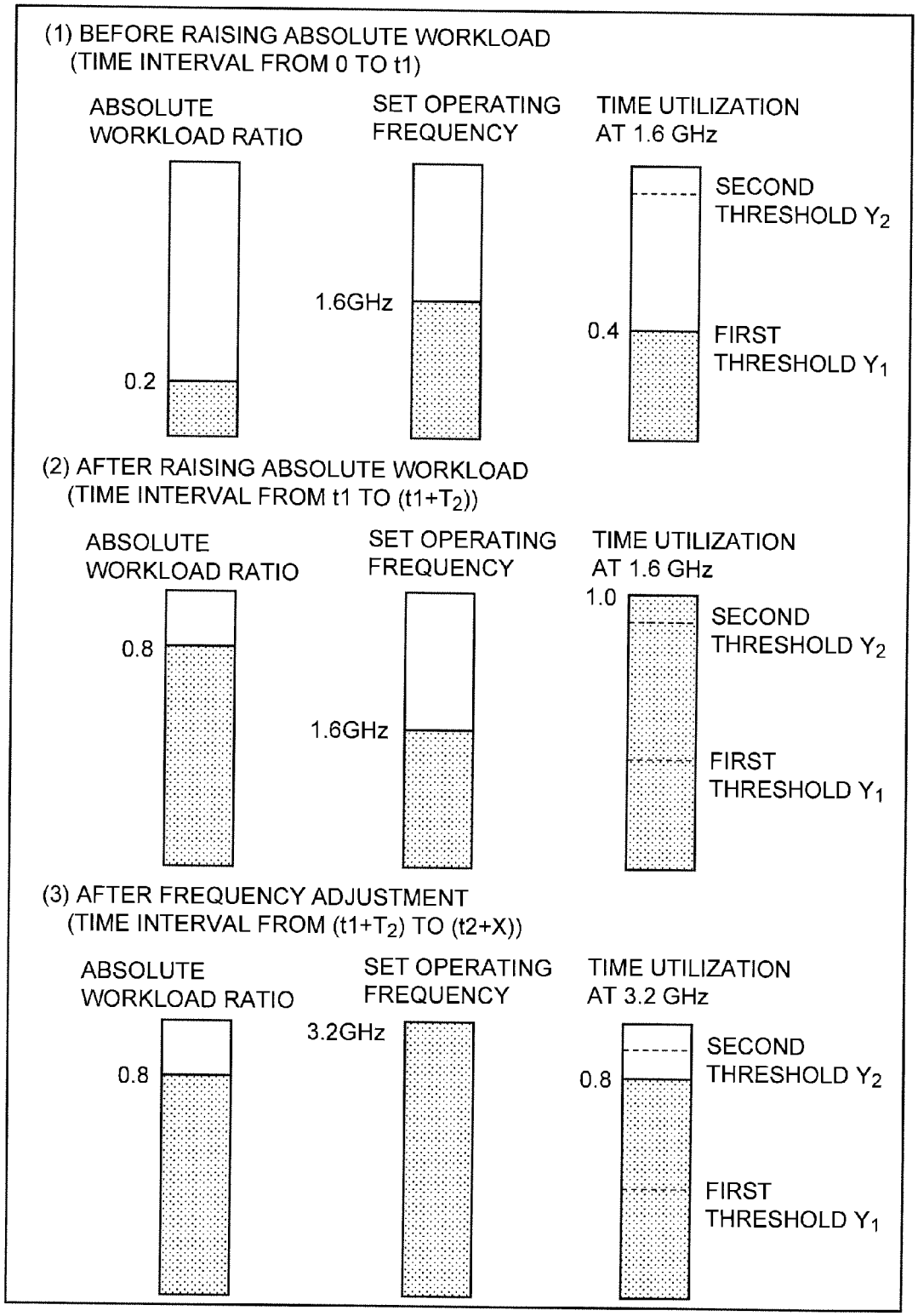
FIG. 21 shows an example of the operation when raising the operating frequency in accordance with an increase in an absolute workload.
Figure 22:
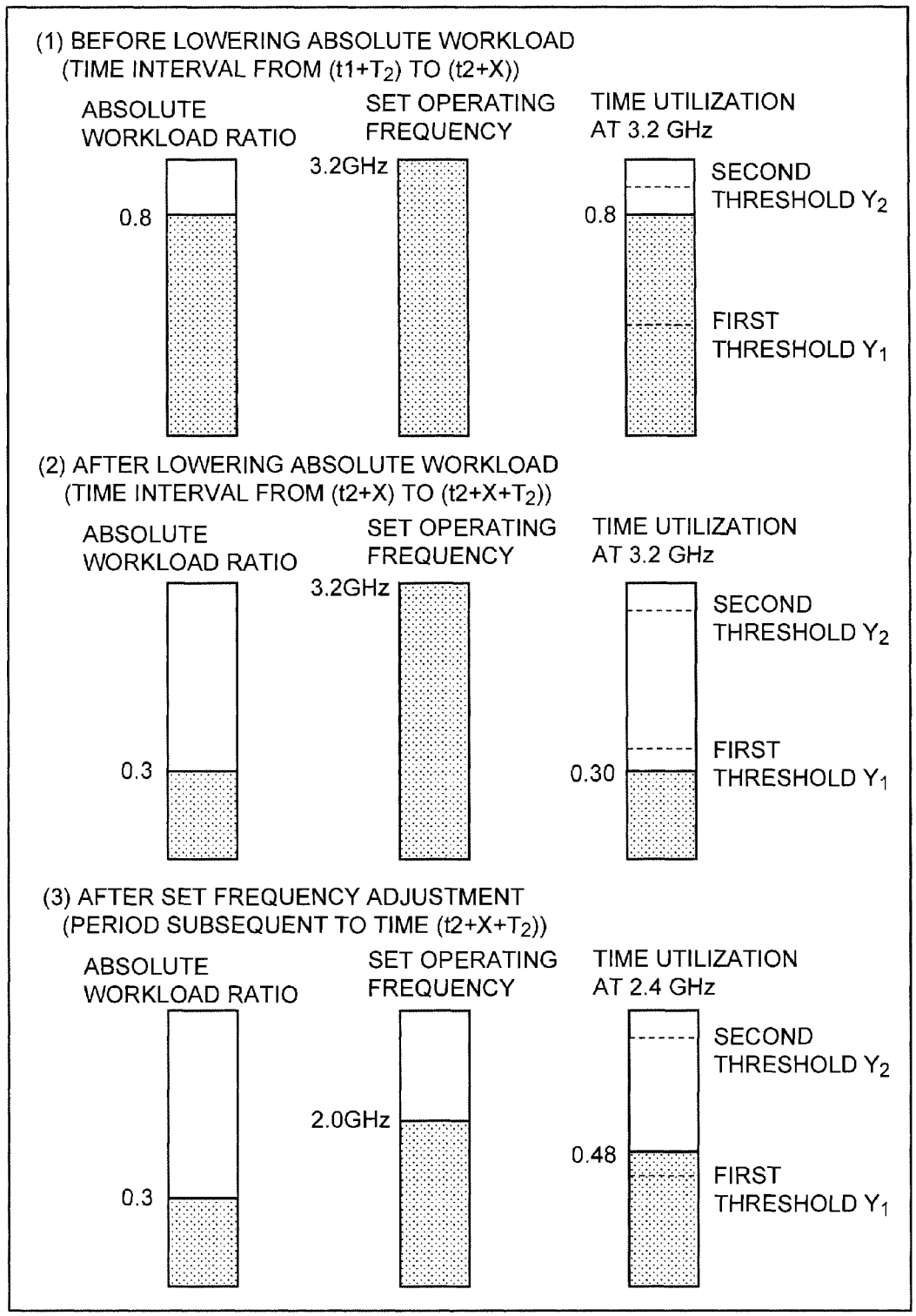
FIG. 22 shows an example of the operation when lowering the operating frequency in accordance with a decrease in the absolute workload.

In FIG. 21 and FIG. 22, "absolute workload ratio" shows how much of the maximum usable execution resources 602 within the physical processor #0 the exerted workload has utilized. The maximum amount of usable execution resources 602 of the physical processor #0 is $3.2 \times 10^9$ cycles/second when operating at 3.2 GHz, which is the highest frequency.

For example, as shown in the upper tier (1) of FIG. 21, for the time interval 0 to t1, since the workload 600 is $6.4 \times 10^8$ cycles/second, the absolute workload ratio is $(6.4 \times 10^8)/(3.2 \times 10^9) = 0.2$.

For the time interval 0 to t1, the time utilization ratio $\alpha_j$ is 0.4, and since this is not below the first threshold $Y_1$, the set operating frequency is not changed.

At time t1, the workload 600 increases, and as shown in the middle tier (2) of FIG. 21, the time utilization ratio $\alpha_j$ rises to 1.0 during the period from time t1 to time $(t1+T_2)$, exceeding the second threshold $Y_2$. As shown in FIG. 2, the workload 600 exceeds the amount of usable execution resources 601 in this period, but the extent of the throughput 603 shortage is not clear simply from the time utilization factor $\alpha_j$ calculated by the computer system.

The reason the operating frequency is changed to 3.2 GHz, which is the highest operating frequency, at time $(t1+T_2)$ is as follows. A shortage of usable execution resources 601 occurred during the time interval from t1 to $(t1+T_2)$, but since the extent of this shortage is not clear from the information held by the computer system, the frequency is raised as high as possible so that a throughput 603 shortage will not occur during the period from time $(t1+T_2)$ to time $(t1+2T_2)$.

As shown in the lower tier (3) of FIG. 21 and the upper tier (1) of FIG. 22, during the time interval from $(t1+T_2)$ to $(t2+X)$, the time utilization ratio $\alpha_j$ is 0.8, and since this is not above the second threshold $Y_2$, an operating frequency change is not carried out.

Since the workload 600 drops at time $(t2+X)$, as shown in the middle tier (2) of FIG. 22, the time utilization ratio $\alpha_j$ becomes 0.3 during the period from time $(t2+X)$ to time ($t2+X+T_2$). Because this is below the first threshold $Y_1$, the set operating frequency is changed to 2.0 GHz at time ($t2+X+T_2$).

As shown in the lower tier (3) of FIG. 22, the time utilization ratio $\alpha_j$ rises to 0.48 during the period after time ($t2+X+T_2$), constituting a value between the first threshold $Y_1$ and the second threshold $Y_2$. Consequently, the set operating frequency is not changed.

According to the specific example described above, the operating frequency of the physical processor #0 is increased when the workload 600 is heavy, and decreased when the workload 600 is light. Since the operating frequency is adjusted in accordance with the workload 600 in this way, power consumption can be reduced compared to cases when the physical processor #0 constantly runs at the highest operating frequency regardless of the workload 600.

Furthermore, the frequency change detector 104 detects the operating frequency of the physical processor #j has been changed by a factor (an external factor) other than the frequency change function 105. In accordance with this, the frequency change detector 104 updates the information 211 in the physical processor table #j to information denoting a new post-update operating frequency $f_j$, and the period subsequent to detecting the operating frequency change is used to calculate the time utilization factor $\alpha_j$. Consequently, an external factor-based operating frequency change does not give rise to an unnecessary frequency adjustment process, and does not cause the calculated time utilization factor to become inaccurate.

The preceding has been an explanation of the embodiment of the this invention.

According to the embodiment described above, the total number of processor cycles rather than the total processor time (the processor time of one or more physical processors 002) is distributed to respective virtual computers 300 as the number of possessing cycles proportional to the service ratios of multiple virtual computers 300. This enables the distribution of the number of execution instructions to each virtual computer 300 during the cycle $T_1$ to approximate the service ratio distribution of multiple virtual computers 300 even when the operating frequencies of the physical processors 002 differ.

The hypervisor 100 calculates for each physical processor a time utilization ratio, which is the ratio that the virtual processor runtime occupies within the processor time of each physical processor 002 for each cycle $T_2$. The hypervisor 100 adjusts the operating frequency of the physical processor 002 based on the time utilization ratio of each physical processor 002. For this reason, the hypervisor 100 is able to carry out an operating frequency adjustment without sacrificing the scheduling accuracy of the virtual processor 303. That is, virtual processor scheduling is compatible with the adjustment of the operating frequency.

In a case where the operating frequency change resulting from a factor external to any of the physical processors 002 is detected, the hypervisor 100 once again carries out initialization processing comprising the calculation of the number of hold cycles and so forth, and thereafter, carries out virtual processor 303 scheduling. For this reason, the distribution of the number of execution instructions (distribution of the virtual processor runtime duration) to the virtual computers is not impaired even when a change in the operating frequency of any of the physical processors 002 due to an external factor is detected.

One embodiment of the present invention has been explained hereinabove, but the present invention is not limited to this embodiment. It should be obvious that various changes can be made without departing from the gist of the present invention.

What is claimed is:

1. A computer system comprising:
one or more physical processors; and
a hypervisor configured to construct multiple virtual computers, each having one or more virtual processors and running on the one or more physical processors, wherein
the hypervisor is configured to carry out, for each first cycle, which is a scheduling initialization cycle:
(A) virtual processor scheduling initialization; and
(B) virtual processor scheduling, and wherein
in the (A), the hypervisor is configured to:
(a1) calculate, based on a sum of operating frequencies of respective physical processors and a length of the first cycle, a total number of processor cycles, which is a number of processor cycles of the one or more physical processors in the first cycle; and
(a2) calculate, with respect to each virtual computer, a number of possessing cycles, which is a value obtained by a distribution of the total number of processor cycles in proportion to service ratios of the multiple virtual computers,
in the (B), the hypervisor is configured to:
(b1) cause a virtual processor in a virtual computer to run on any of the one or more physical processors based on the number of possessing cycles of each virtual computer.

2. The computer system according to claim 1, wherein, in the (A), the hypervisor is configured to:
(a3) calculate, for each physical processor, a time slice duration based on a physical processor operating frequency and a time slice which is expressed as a number of cycles in common with the one or more physical processors, and
in the (B), in a case where a length of a virtual processor runtime reaches a time slice duration of the physical processor on which the virtual processor runs, the virtual processor is configured to suspend running thereof,
in the (B), the hypervisor is configured to:
(b2) update a number of used cycles, which is the number of processor cycles that have been used by a virtual computer having the suspended virtual processor, each time the running of a virtual processor is suspended; and
(b0) prior to the (b1), select a virtual computer having the lowest priority from among virtual computers in a ready status,
wherein an update of the number of used cycles is the adding to the most latest number of used cycles the product of the operating frequency of the physical processor on which the suspended virtual processor has been running and a runtime, which is the length of time during which the virtual processor has been running,
a virtual computer priority is a ratio of the number of used cycles with respect to the number of hold cycles of the virtual computer, and
the virtual processor that is made to run in the (b1) is the virtual processor in the virtual computer selected in the (b0).

3. The computer system according to claim 2, wherein, in the (b2), a scheduling function is configured to update a number of out-of-service times, which is a number of times that the post-update number of used cycles exceeds a value of the number of hold cycles, for a virtual computer having the suspended virtual processor, wherein a virtual computer priority is a value in which the number of out-of-service times of the virtual computer is reflected in the ratio of the number of used cycles with respect to the number of hold cycles of the virtual computer, and an update of the number of used cycles in a case where an out-of-service has occurred is the adding to the most latest number of used cycles a value obtained by subtracting the number of possessing cycles of the virtual computer having the virtual processor from the product of the operating frequency of a physical processor on which the suspended virtual processor has been running and a runtime, which is the length of time that the virtual processor has been running.

4. The computer system according to claim 2, wherein the hypervisor further comprises:

a frequency adjustment feature configured to carry out a frequency adjustment process that changes an operating frequency of a physical processor at each second cycle, which is the cycle of the frequency adjustment process; and a load monitoring agent configured to identify a current time for the one or more physical processors and calculate a time utilization ratio for each physical processor, wherein the frequency adjustment feature is configured to detect that an operating frequency of a physical processor has been changed by an external factor, which is a different factor, and set an external factor flag, which is a flag signifying that the operating frequency has been changed by an external factor, to ON, the time utilization ratio is a ratio of a total virtual processor runtime with respect to a computation target time, the total virtual processor runtime is the total of lengths of time that virtual processors ran in the computation target time, The computation target time, in a case where the external factor flag is ON, is the length of time from the time at which an operating frequency change has been detected until the identified current time, the computation target time, in a case where the external factor flag is OFF, is the length of time from the time at which the most latest frequency adjustment process has been carried out until the identified current time, the frequency adjustment feature is configured to carry out the frequency adjustment process based on the time utilization factor, and when the frequency adjustment process has ended, reset the total virtual processor runtime and the time utilization factor, and set the external factor flag to OFF, and the hypervisor, in a case where the operating frequency has been changed by the external factor, is configured to carry out the (A) even though the first cycle has not elapsed since the (A) was carried out.

5. The computer system according to claim 1, wherein, in the (B), the hypervisor is configured to:

(b2) update a number of used cycles, which is a number of processor cycles used by a virtual computer having the suspended virtual processor, each time the running of a virtual processor is suspended; and (b0) prior to the (b1), select a virtual computer in accordance with a priority of each virtual computer, wherein an update of the number of used cycles is carried out based on the operating frequency of the physical processor on which the suspended virtual processor has been running, a runtime, which is the length of time that the virtual processor has been running, and the most latest number of used cycles, a virtual computer priority is a value based on the number of used cycles and the number of possessing cycles of the virtual computer, and the virtual processor that is made to run in the (b1) is the virtual processor in the virtual computer selected in the (b0).

6. The computer system according to claim 5, wherein the priority is the ratio of the number of used cycles with respect to the number of possessing cycles, and in the (b0), a virtual computer having a low priority is preferentially selected.

7. The computer system according to claim 5, wherein, in the (b2), the hypervisor is configured to update a number of out-of-service times, which is a number of times that the post-update number of used cycles exceeds a value of the number of possessing cycles, for a virtual computer having the suspended virtual processor, and the priority is a value that the number of out-of-service times is reflected in addition to the number of possessing cycles and the number of used cycles.

8. The computer system according to claim 5, wherein, in the (b2), in a case where an out-of-service, which signifies the post-update number of used cycles exceeding the value of the number of possessing cycles, has occurred with respect to a virtual computer having the suspended virtual processor, the number of used cycles is updated based on the operating frequency of the physical processor on which the suspended virtual processor has been running, a runtime, which is the length of time during which the virtual processor has been running, the number of possessing cycles, and the most latest number of used cycles.

9. The computer system according to claim 1, wherein, in the (A), the hypervisor is configured to:

(a3) calculate, for each physical processor, a time slice duration based on a physical processor operating frequency and a time slice, which is expressed as the number of cycles in common with the one or more physical processors, and in the (B), in a case where a length of a virtual processor runtime reaches the time slice duration of the physical processor on which the virtual processor runs, the virtual processor is configured to suspend running thereof.

10. The computer system according to claim 1, wherein the hypervisor further comprises a frequency adjustment feature configured to carry out a frequency adjustment process that changes the operating frequency of a physical processor, wherein the frequency adjustment feature is configured to detect that an operating frequency of a physical processor has been changed by an external factor, which is a different factor, and the hypervisor, in a case where the operating frequency has been changed by the external factor, is configured to carry out the (A) even though the first cycle has not elapsed since the (A) was carried out.

11. The computer system according to claim 10, further comprising a load monitoring agent configured to identify a current time for the one or more physical processors and calculate a time utilization ratio for each physical processor, wherein the time utilization ratio is a ratio of a total virtual processor runtime with respect to a computation target time, the total virtual processor runtime is the total of the lengths of time that virtual processors have been running in the computation target time, the computation target time, in a case where an operating frequency has not been changed by the external factor, is the length of time from the time that the frequency adjustment process of the most latest time has been carried out until the identified current time, the computation target time, in a case where an operating frequency has been changed by the external factor, is the length of time from the time that the operating frequency change has been detected until the identified current time, the frequency adjustment feature is configured to carry out the frequency adjustment process based on the time utilization factor, and when the frequency adjustment process has ended, reset the total virtual processor runtime and the time utilization factor.

12. The computer system according to claim 11, wherein the frequency adjustment feature, in the frequency adjustment process, is configured to raise an operating frequency with respect to a physical processor for which the time utilization ratio exceeds a second threshold, and lower an operating frequency with respect to a physical processor for which the time utilization ratio is below a first threshold that is lower than the second threshold.

13. A hypervisor The computer system according to claim 1, wherein the hypervisor is configured to run an idle process on a physical processor on which a virtual processor does not run.

14. A scheduling method for virtual processors in multiple virtual computers, each having one or more virtual processors and running on one or more physical processors, the scheduling method comprising:
calculating, by the one or more physical processors, based on a sum of operating frequencies of respective physical processors and a length of a first cycle, a total number of processor cycles, which is a number of processor cycles of the one or more physical processors in the first cycle;

calculating, by the one or more physical processors, with respect to each virtual computer, a number of possessing cycles, which is a value obtained by a distribution of the total number of processor cycles in proportion to service ratios of the multiple virtual computers; and causing a virtual processor in a virtual computer to run on any of the one or more physical processors based on the number of possessing cycles of each virtual computer.

15. A non-transitory computer readable medium comprising a hypervisor to be executed on a computer system which comprises one or more physical processors, wherein when the hypervisor is executed by the one or more physical processors, it constructs multiple virtual computers, each having one or more virtual processors, and causes the one or more physical processors to perform operations comprising:

calculating, based on a sum of operating frequencies of respective physical processors and a length of a first cycle, a total number of processor cycles, which is a number of processor cycles of the one or more physical processors in the first cycle;

calculating, with respect to each virtual computer, a number of possessing cycles, which is a value obtained by a distribution of the total number of processor cycles in proportion to service ratios of the multiple virtual computers; and causing a virtual processor in a virtual computer to run on any of the one or more physical processors based on the number of possessing cycles of each virtual computer.

* * * * *